(12) United States Patent
Shen et al.

(10) Patent No.: US 9,838,306 B2
(45) Date of Patent: Dec. 5, 2017

(54) RSVP MAKE-BEFORE-BREAK LABEL REUSE

(71) Applicant: Juniper Networks, Inc., Sunnyvale, CA (US)

(72) Inventors: Yimin Shen, Shrewsbury, MA (US); Raveendra Torvi, Nashua, NH (US); Ross W. Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 120 days.

(21) Appl. No.: 14/675,338

(22) Filed: Mar. 31, 2015

(65) Prior Publication Data

US 2016/0294683 A1    Oct. 6, 2016

(51) Int. Cl.
| | |
|---|---|
| *H04L 12/00* | (2006.01) |
| *H04L 12/723* | (2013.01) |
| *H04L 12/707* | (2013.01) |
| *H04L 12/703* | (2013.01) |
| *H04L 12/913* | (2013.01) |

(52) U.S. Cl.
CPC .............. *H04L 45/50* (2013.01); *H04L 45/22* (2013.01); *H04L 45/24* (2013.01); *H04L 45/28* (2013.01); *H04L 47/724* (2013.01)

(58) Field of Classification Search
CPC ......... H04L 45/50; H04L 45/00; H04L 45/22; H04L 45/16; H04L 47/10; H04L 45/48; H04L 47/724; H04L 45/04; H04L 45/507
See application file for complete search history.

(56) References Cited

U.S. PATENT DOCUMENTS

| | | | |
|---|---|---|---|
| 8,077,726 B1 * | 12/2011 | Kumar | .................... H04L 45/22 370/395.31 |
| 8,681,637 B2 | 3/2014 | Vigoureux et al. | |

(Continued)

FOREIGN PATENT DOCUMENTS

WO    2010023511 A1    3/2010

OTHER PUBLICATIONS

Awduche et al., "RSVP-TE: Extensions to RSVP for LSP Tunnels," Network Working Group Internet Draft, draft-ieff-mpls-rsvp-lsp-tunnel-09.txt, Aug. 2001, 64 pp.

(Continued)

*Primary Examiner* — Sai Aung
(74) *Attorney, Agent, or Firm* — Shumaker & Sieffert, P.A.

(57) ABSTRACT

Techniques are described for establishing a second label switched path (LSP) instance of an LSP having a first LSP instance. In one example, for each downstream router designated for the second LSP instance of the LSP, the router determines whether the router is part of the first instance of the LSP and, if so, whether the first and second LSP instances for that downstream router share a common link to a nexthop router. If the first and second LSP instances share a common link to a nexthop router, the downstream router transmits a first message to the nexthop router, wherein the first message includes a suggested label. The downstream router receives, from the nexthop router, a second message, wherein the second message includes the suggested label. In another example, a label reuse indicator flag in a message from the ingress router causes routers on the second LSP instance to reuse the label of the first LSP instance when the same link is used to the upstream router for both LSP instances.

28 Claims, 9 Drawing Sheets

(56) References Cited

U.S. PATENT DOCUMENTS

| | | | | |
|---|---|---|---|---|
| 9,071,541 | B2* | 6/2015 | Atlas | H04L 45/34 |
| 9,253,250 | B2 | 2/2016 | Asati et al. | |
| 2003/0063613 | A1* | 4/2003 | Carpini | H04L 45/02 |
| | | | | 370/401 |
| 2005/0169266 | A1* | 8/2005 | Aggarwal | H04L 12/66 |
| | | | | 370/389 |
| 2012/0257886 | A1* | 10/2012 | Sun | H04L 69/40 |
| | | | | 398/5 |
| 2013/0286846 | A1* | 10/2013 | Atlas | H04L 45/34 |
| | | | | 370/236 |
| 2016/0261494 | A1 | 9/2016 | Dai et al. | |
| 2016/0294683 | A1* | 10/2016 | Shen | H04L 45/50 |

OTHER PUBLICATIONS

Dai et al., "MPLS RSVP-TE MBB Label Reuse," Network Working Group Internet Draft, draft-dai-mpls-rsvp-te-mbb-label-reuse-00, Mar. 9, 2015, 7 pp.

Extended Search Report from counterpart European Application No. 16161510.9, dated May 31, 2016, 12 pp.

Berger, "Generalized Multi- Protocol Label Switching (GMPLS) Signaling Resourece ReserVation Protocol- Traffic Engineering (RSVP-TE) Extensions," Network Working Group, the Internet Society, Jan., 2003, 42 pp.

Awduche et al., "Rsvp-Te: Extensions to RSVP for LSP Tunnels," Network Working Group, The Internet Society, Dec. 2001, 61 pp.

Response to Office Action mailed May 21, 2016, from European Patent Application No. 16161510.9, filed Apr. 5, 2017, 2 pp.

Braden et al., "Resorce ReSerVation Protocol (RSVP)—Version 1 Message Processing Rules," Network Working Group, RFC 2209, Sep. 1997, 25 pp.

Pan et al., "Fast Reroute Extensions to RSVP-TE for LSP Tunnels," RFC 4090, Network Working Group, May 2005, 38 pp.

Prosecution History from U.S. Appl. No. 14/682,799, dated Mar. 15, 2017 through Jul. 3, 2017, 17 pp.

Notice of Allowance from U.S. Appl. No. 14/682,799, dated Aug. 14, 2017, 5 pp.

Notice of Intent to Grant from counterpart European Application No. 16161510.9, dated Jul. 24, 2017, 51 pp.

* cited by examiner

RSVP MAKE-BEFORE-BREAK LABEL REUSE

TECHNICAL FIELD

The disclosure relates to computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as a Border Gateway Protocol (BGP) or an Interior Gateway Protocol (IGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by an IGP link-state routing protocol, such as an Intermediate System—Intermediate System (ISIS) protocol or an Open Shortest Path First (OSPF) protocol.

Head-end routers of an LSP are commonly known as ingress routers, while routers at the tail-end of the LSP are commonly known as egress routers. Ingress and egress routers, as well as intermediate or transit routers along the LSP that support MPLS, are referred to generally as label switching routers (LSRs). The ingress router uses routing information, propagated from the egress router, to determine the LSP, to assign labels for the LSP, and to affix a label to each packet. The LSRs use MPLS protocols to receive MPLS label mappings from downstream LSRs and to advertise MPLS label mappings to upstream LSRs. When an LSR receives an MPLS packet from an upstream router, the LSR performs a lookup and swaps the MPLS label according to the information in its forwarding table based on the lookup and forwards the packet to the appropriate downstream LSR. The egress router removes the label from the packet and forwards the packet to its destination in accordance with non-label based packet forwarding techniques.

SUMMARY

In general, this disclosure describes techniques for reusing downstream-assigned labels when establishing a new instance of a label switched path (LSP) between an ingress router and an egress router prior to tearing down an existing instance of the LSP using make-before-break (MBB) procedures for the Resource Reservation Protocol (RSVP). The techniques described in this disclosure enable a routing engine of any non-ingress router along a path of the new LSP instance to reuse a label previously allocated for the existing LSP instance as the downstream-assigned label for the new LSP instance when the paths of the existing LSP instance and the new LSP instance overlap. In this way, the non-ingress router does not need to update a label route stored in its forwarding plane for the reused label. In addition, when the new LSP instance completely overlaps the existing LSP instance, the ingress router of the LSP may avoid updating an ingress route stored in its forwarding plane for applications that use the LSP. The disclosed techniques can reduce or avoid network churn due to a large number of label route updates during the RSVP MBB procedures.

In one example, this disclosure is directed to a method for establishing a second label switched path (LSP) instance of an LSP having a first LSP instance. For each downstream router designated for the second LSP instance of the LSP, the router determines whether the router is part of the first instance of the LSP and, if so, whether the first and second LSP instances for that downstream router share a common link to a nexthop router. If the first and second LSP instances share a common link to a nexthop router, the downstream router transmits a first message to the nexthop router, wherein the first message includes a suggested label. The downstream router receives, from the nexthop router, a second message, wherein the second message includes the suggested label.

In another example, this disclosure is directed to a router comprising a routing engine comprising one or more processors configured to establish a second LSP instance of an LSP having a first LSP instance, wherein the second LSP instance includes designated routers on a second path, to determine whether the router is part of the first instance of the LSP and, if so, to determine whether the first and second LSP instances for the router share a common link to a nexthop router. If the first and second LSP instances of the LSP share a common link to a nexthop router, the one or more processors are configured to transmit a first message to the nexthop router, wherein the first message includes a suggested label and receive, from the nexthop router, a second message, wherein the second message includes the suggested label. If the first and second LSP instances of the LSP do not share a common link to a nexthop router, the one or more processors are configured to install an inactive nexthop entry for the second LSP instance. The router further comprises a forwarding engine comprising one or more processors configured to, upon establishment of the second LSP instance and tear down of the first LSP instance by the ingress router, forward traffic along the path of the second LSP instance.

In a further example, this disclosure is directed to a non-transitory computer-readable medium comprising instructions that when executed cause one or more programmable processors of a router to establish a second LSP instance of an LSP having a first LSP instance, wherein the second LSP instance includes designated routers on a second path, and to determine whether the router is part of the first instance of the LSP and, if so, whether the first and second LSP instances for the router share a common link to a nexthop router. The non-transitory computer-readable medium further comprises instructions that when executed cause one or more programmable processors of a router to, when the first and second LSP instances of the LSP share a common link to a nexthop router, transmit a first message to the nexthop router, wherein the first message includes a suggested label and to receive, from the nexthop router, a second message, wherein the second message includes the suggested label. The non-transitory computer-readable medium further comprises instructions that when executed cause one or more programmable processors of a router to, when the first and second LSP instances of the LSP do not share a common link to a nexthop router, install an inactive nexthop entry for the second LSP instance.

In another example, this disclosure is directed to a system comprising an egress router, an ingress router of a label switched path (LSP) established between the ingress router and the egress router, the ingress router configured to send traffic along a first path through a first LSP instance of the LSP and to send a first message requesting establishment of a second LSP instance of the LSP, the first message indicating a second path for the second LSP instance and at least one downstream router of the second LSP instance of the LSP, wherein each downstream router designated for the second LSP instance receives the first message and transmits the first message to a nexthop router designated in the first message, wherein, when the first and second LSP instances for one or more of the downstream routers share a common link to the designated nexthop router, the first message transmitted to the nexthop routers includes a suggested label for the common link.

In yet another example, in a system in which each downstream router is connected across a first link to an upstream router and across a second link to a nexthop router, a method is described for establishing a second label switched path (LSP) instance of an LSP having a first LSP instance. A downstream router designated for the second LSP instance of the LSP determines whether the downstream router is part of the first LSP instance of the LSP. If the downstream router is part of the first LSP instance of the LSP, the downstream router determines whether the first and second LSP instances for that downstream router share a common link to a nexthop router designated by the second LSP instance of the LSP. The downstream router transmits a Resource Reservation Protocol (RSVP) Path message to the nexthop router designated by the second LSP instance of the LSP, wherein, when the first and second LSP instances for that downstream router share a common link to a nexthop router designated by the second LSP instance of the LSP, the RSVP Path message includes a suggested label. The downstream router receives an RSVP Resv message from the nexthop router designated by the second LSP instance of the LSP and, if the first and second LSP instances for the downstream router do not share a common link to a nexthop router designated by the second LSP instance of the LSP, the downstream router installs an inactive nexthop entry for the second LSP instance in the downstream router while continuing to use an active nexthop entry to send traffic to the nexthop router designated for the first LSP instance of the LSP, wherein the inactive nexthop entry includes a label received from the nexthop router with the RSVP Resv message.

In yet another example, a method is described for establishing a second label switched path (LSP) instance of an LSP having a first LSP instance. The method comprises enabling label reuse for a label associated with the first LSP instance, wherein enabling includes determining if a first message associated with the LSP includes a label reuse indicator and determining, for each downstream router, if label reuse is enabled for the second LSP instance. If label reuse is enabled for the second LSP instance, the method determines whether the first and second LSP instances for that downstream router share a common link to an upstream router and, if the first and second LSP instances share a common link between the downstream router and the upstream router, transmits an upstream router message to the upstream router, wherein the upstream router message includes a label associated with first LSP instance traffic from the upstream router to the downstream router. The method further includes receiving, from the upstream router, traffic associated with the second LSP instance, wherein the traffic associated with the second LSP instance is labelled with the label associated with the first LSP instance traffic from the upstream router to the downstream router.

The details of one or more examples are set forth in the accompanying drawings and the description below. Other features, objects, and advantages will be apparent from the description and drawings, and from the claims.

DETAILED DESCRIPTION

Figure 1:
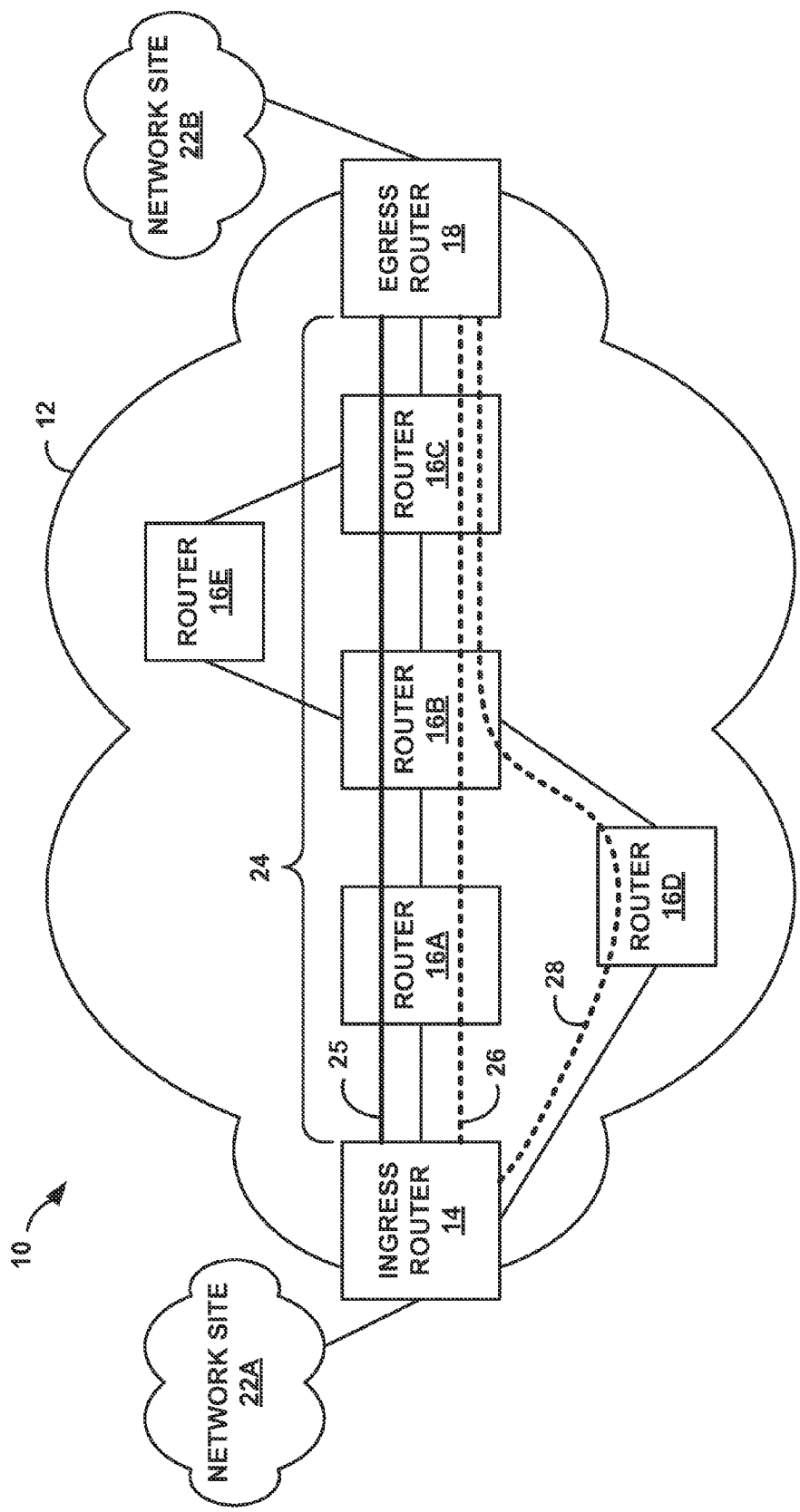
FIG. 1 is a block diagram illustrating an example system in which routers are configured to forward network traffic in accordance with the techniques of this disclosure.

FIG. 1 is a block diagram illustrating an example network system 10 in which ingress router 14, transit routers 16A-16E ("transit routers 16"), and egress router 18 of network 12 are configured to forward network traffic (e.g., network packets) in accordance with the techniques of this disclosure. In the example of FIG. 1, ingress router 14 is an ingress router of label switched path (LSP) 24 and egress router 18 is the egress router of LSP 24. Transit routers 16A, 16B and 16C are intermediate or transit routers along a first path of a first LSP instance 25 (represented as a solid line) of LSP 24.

Routers 14, 16 and 18 represent any network device that routes or otherwise forwards traffic through network 12. Typically, routers 14, 16, 18 represent a L3 packet-switching device that operates at L3 to exchange routing information that describes a current topology of network 12 using a routing protocol, such as an Interior Gateway Protocol (IGP) or a Border Gateway Protocol (BGP). Routers 14, 16, 18 then process this routing information, selecting paths through its representation of the topology of network 12 to reach all available destinations to generate forwarding information. In other words, routers 14, 16, 18 reduce these paths to so-called "next hops" which identify interfaces to which to forward packets destined for a particular destination, where the forwarding information includes this list of next hops. Routers 14, 16, 18 then install this forwarding information in a forwarding plane of the router, whereupon the forwarding plane forwards received traffic in accordance with the forwarding information.

Network 12 may comprise an Internet Protocol (IP) network that uses Multi-Protocol Label Switching (MPLS) protocols to engineer traffic patterns over an MPLS core of the IP network. By utilizing MPLS, ingress router 14 and egress router 18 can request distinct paths, i.e., label switched paths (LSPs), through network 12 to carry packets between customers or subscribers in remote network sites 22A-22B ("network sites 22"). A short label associated with a particular LSP, e.g., LSP 24, is affixed to the packets that travel through network 12 via LSP 24. Transit routers 16 along the path cooperatively perform MPLS operations to forward the packets along the established LSP 24. A variety of protocols exist for establishing LSPs, e.g., the Label Distribution Protocol (LDP) and the Resource Reservation Protocol with Traffic Engineering extensions (RSVP-TE).

In some examples, network 12 may be a service provider network. For example, network 12 may represent one or more networks owned and operated by a service provider (which is commonly a private entity) that offer one or more services for consumption by customers or subscribers in network sites 22. In this context, network 12 is typically a layer three (L3) packet-switched network that provides L3 connectivity between a public network, such as the Internet, and one or more network sites 22. Often, this L3 connectivity provided by service provider network 12 is marketed as a data service or Internet service, and subscribers in network sites 22 may subscribe to this data service. Network 12 may represent a L3 packet-switched network that provides data, voice, television and any other type of service for purchase by subscribers and subsequent consumption by the subscribers in network sites 22.

Network sites 22 may be local area networks (LANs), wide area networks (WANs), or other private networks that include a plurality of subscriber devices (not shown). In some examples, network sites 22 may comprise distributed network sites of the same customer enterprise. In other examples, network sites 22 may belong to different entities. Subscriber devices within network sites 22 may include personal computers, laptops, workstations, personal digital assistants (PDAs), wireless devices, network-ready appliances, file servers, print servers or other devices capable of requesting and receiving data via network 12. While not shown in the example of FIG. 1, network system 10 may include additional service provider networks, subscriber networks and other types of networks, such as access networks, private networks, or any other type of network.

According to the techniques of this disclosure, routers 14, 16, 18 use RSVP-TE to establish instances of LSP 24. For example, ingress router 14 sends an RSVP Path message towards egress router 18 requesting establishment of first LSP instance 25 of LSP 24. The RSVP Path message includes a label request object that requests transit routers 16 and egress router 18 to provide a downstream-assigned label for first LSP instance 25 of LSP 24. The RSVP Path message also includes a session object associated with LSP 24 that aids in session identification and diagnostics. In some cases, the RSVP Path message may include an explicit route object (ERO) that specifies the first path of first LSP instance 25 between ingress router 14 and egress router 18. If one of transit routers 16 receives the RSVP Path message propagated downstream from ingress router 14 and is incapable of providing the requested label (e.g., cannot satisfy admission control requirements of first LSP instance 25), the transit router sends a PathErr message to ingress router 14. If the label request object included in the RSVP Path message is not supported end to end along the first path of first LSP instance 25 of LSP 24, ingress router 14 will be notified by the first one of transit routers 16 that does not provide support.

Egress router 18 of LSP 24 receives the RSVP Path message for first LSP instance 25 and responds to the label request object in the RSVP Path message by including a label object in its response RSVP Resv message. Egress router 18 sends the RSVP Resv message back upstream towards ingress router 14 following the path state created by the RSVP Path message in reverse order. Each of transit routers 16 along the first path of first LSP instance 25 receives the RSVP Resv message including a label object from a next hop router, and uses the received downstream label to identify outgoing traffic associated with first LSP instance 25. Each of transit routers 16 along the first path of first LSP instance 25 then allocates a new label, places that label in the corresponding label object of the RSVP Resv message, and sends the RSVP Resv message upstream towards ingress router 14. The label sent upstream in the label object of the RSVP Resv message from a given one of transit routers 16, e.g., transit router 16B, is the label that transit router 16B will use to identify incoming traffic associated with first LSP instance 25. Transit router 16B can then program its forwarding plane based on the received downstream label and the allocated label for first LSP instance 25 in order to map incoming labeled packets to a next hop label forwarding entry. When the RSVP Resv message reaches ingress router 14, first LSP instance 25 of LSP 24 is effectively established.

One of the requirements for traffic engineering is the capability to reroute an established LSP under a number of conditions based on administrative policy. For example, in some cases, an administrative policy may dictate that a given LSP be rerouted when a more optimal route becomes available. In another case, a given LSP may be rerouted when admission control requirements for the LSP change. A common admission control requirement change is a bandwidth requirement change, especially with a widely implemented auto-bandwidth feature that adjusts LSP bandwidth automatically based on feedback from traffic monitoring. In a further case, a given LSP may be rerouted upon failure of a resource, e.g., a node or a link, along an established path of the LSP.

In general, it is highly desirable not to disrupt traffic or adversely impact network operations while rerouting an existing LSP. Because of this, the RSVP protocol supports a make-before-break (MBB) procedure to allow an LSP to be rerouted to a new path, without disrupting user traffic, before the old path is disabled. This rerouting requirement necessitates establishing a new LSP instance and transferring traffic from an existing LSP instance onto the new LSP instance before tearing down the existing LSP instance. To accomplish this, ingress router 14 computes a new path (based on the up-to-date traffic requirements, network topology, and network resources), signals a new LSP, switches traffic from the old LSP to the new LSP, and finally tears down the old LSP.

In some examples, in order to perform a reroute of LSP 24, ingress router 14 selects a new LSP ID and sends a new RSVP Path Message towards egress router 18 using the original session object and a new explicit route object (ERO) to define a second path for a second LSP instance 26 or 28 (represented as dotted lines) of LSP 24. During establishment of second LSP instances 26 or 28, ingress router 14 continues to use first LSP instance 25 and refresh the RSVP Path message for first LSP instance 25 of LSP 24. On links that do not overlap between first LSP instance 25 and second LSP instance 26 or 28, the new RSVP Path message is treated as a conventional new LSP instance setup. On links that do overlap between first LSP instance 25 and second LSP instance 26 or 28, the shared session object allows second LSP instance 26 or 28 to be established using resources that are shared with first LSP instance 25. Once ingress node 14 receives a RSVP Resv message for second LSP instance 26 or 28, the second LSP instance 26 or 28 is established. Ingress router 14 then transitions traffic to second LSP instance 26 or 28, and tears down first LSP instance 25 using RSVP MBB procedures. For additional details of the RSVP MBB procedures, see D. Awduche, "RSVP-TE: Extensions to RSVP for LSP Tunnels," Network Working Group RFC 3209, December 2001, the entire contents of which are incorporated by reference herein.

As a general practice, each non-ingress router along the path of the new LSP instance assigns a new and different label for the new LSP instance. In this case, there is a completely separate LSP for the new LSP instance end to end, with the exception of penultimate hop popping (PHP) in which the new LSP instance shares the implicit/explicit null label with the existing LSP instance for the last segment of the LSP. The new and different labels for each LSP instance allow end to end path verification for each LSP instance independently. The new and different labels for each LSP instance, however, also require each non-ingress router along the path of the new LSP instance to perform a label route add in its forwarding plane to associate the newly allocated label with the LSP, and subsequently perform a label route delete in its forwarding plane to remove the existing label associated with the LSP. In addition, the ingress router of the LSP performs ingress route updates in its forwarding plane when switching to the new LSP instance. For example, the ingress router updates applications that use the LSP in order to transmit traffic according the new ingress route that associates a different outgoing label with the new LSP instance. The ingress route updates performed by the ingress router may also cause other elements of the network, which are dependent on the LSP, to perform updates.

Depending on the network topology, the new LSP may share some links in common with the old LSP. Generally, despite the two LSPs sharing a common link, the downstream router of the link will always assign a new label to the new LSP (except when the router is the egress router of the LSP and it assigns implicit/explicit NULL to both LSPs). This means that the upstream router of link will always receive a distinct label for the new LSP, although both LSPs traverse the common link to the common downstream router. This also applies to the case where the two LSPs share a common link between the ingress router and the first hop transit router.

Label changes over a common link during a make-before-break transition are unnecessary. This is because, at any time, ingress router 14 should only use one of the new LSP and old LSP label to carry traffic. In other words, there never should be a co-existence of traffic flows with the two LSP labels over that common link. Therefore, it is technically possible for the new LSP to reuse the old LSP's label over the common link. This will save the upstream router of the common link from programming the new label and deprogramming the old label in the data or forwarding plane.

The techniques of this disclosure enable routers of an existing LSP to keep or reuse the same labels across different LSP instances, where possible, without affecting either routing functionalities or data path verification of each LSP instance, in order to avoid or reduce network churn caused by label route updates during the RSVP MBB procedures. In addition, keeping or reusing labels according to the disclosed techniques may speed up establishment of the new LSP instance due to not needing to wait for label route and ingress route updates and forwarding plane programming at each router along the path of the new LSP instance.

Reusing a label in MBB can also provide additional benefit for ingress router 14. On ingress router 14, a label change during MBB requires that all application routes and services (e.g., layer 2/3 VPNs) carried by the LSP update their routes and forwarding state to switch to the new label. On a scaled setup, the workload for ingress router 14 to perform such kind of route updates is normally not trivial, and may result in a system churn. The time to complete the update may be unpredictable. If the ingress router prematurely tears down the old LSP while the route update is still in progress, traffic will be disrupted. This is viewed as a great challenge for the scalability of RSVP.

In some cases of RSVP LSP make-before-break, such as auto-bandwidth, global repair, and path re-optimization, a link may remain unchanged between the old LSP and the new LSP, or may be forced (e.g. by strict hop constraint) to remain unchanged. For these cases, the downstream router of the link, where possible, reuses the label of the old LSP for the new LSP. Thus, the upstream router of the link is able to avoid forwarding state update across the MBB. Particularly in the case where the upstream router is the ingress router, this allow the router to avoid route and forwarding state update for applications and services carried by the LSP, and to improve the convergence time of MBB and scalability of RSVP.

According to the techniques described in this disclosure, routers of an LSP may be configured to reuse labels during RSVP MBB procedures when the primary paths of an existing LSP instance and a new LSP instance at least partially overlap. For example, a routing engine of any non-ingress router (e.g., any of transit routers 16 or egress router 18) along the path of second LSP instance 26 or 28 may be configured to reuse a first label previously allocated for first LSP instance 25 as a second label for second LSP instance 26 or 28 when the first and second LSP instances overlap at the non-ingress router. In this way, the non-ingress router does not need to update a label route entry in a label forwarding information base (LFIB) stored in its forwarding plane for the reused label. Label reuse under partial or total overlap condition reduces unnecessary LFIB updates, which further reduces the possibility of error and improves network convergence latency.

Figure 2:
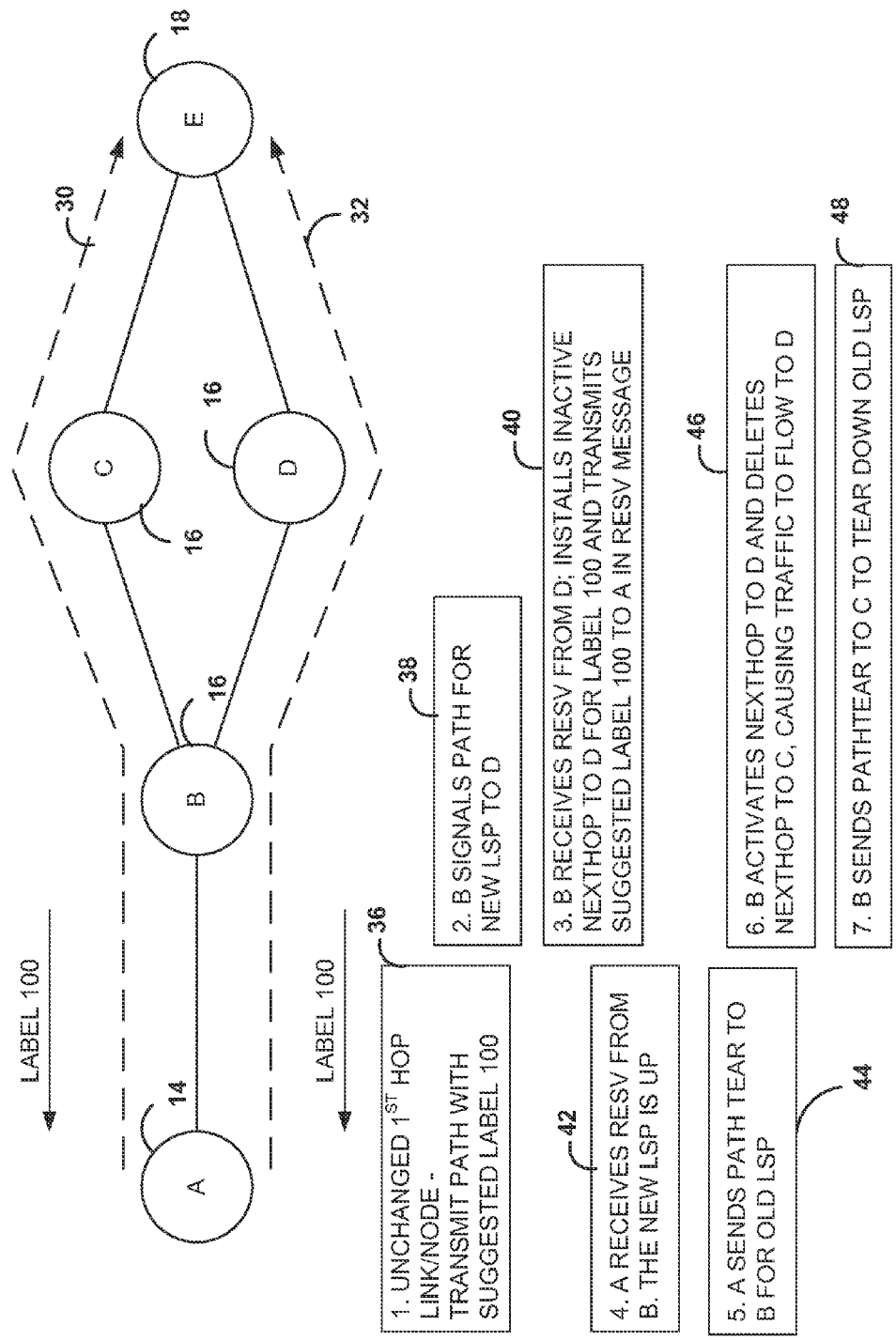
FIG. 2 is a flowchart illustrating an example operation of a system including an ingress router of an LSP and at least one downstream router of the LSP in a label reuse mode of label assignment for MBB procedures.

FIG. 2 is a flowchart illustrating an example operation of a system including an ingress router of an LSP and at least one downstream router of the LSP in a suggested label mode of label assignment for MBB procedures. In the example of FIG. 2, an ingress router 14 (router A) is connected through a transit router 16 (router B) to two other transit routers (routers C and D). Routers C and D are connected in turn to an egress router 18 (router E).

In the example of FIG. 2, an LSP 30 is defined to pass data through routers B and C to egress router E. A label of 100 defines the link between router A and router B. At some time after LSP 30 is defined, router A initiates a new path (LSP 32). When the path computation for LSP 32 indicates that the path from router A to router B remains unchanged, router A sends a Path message with the existing label (label 100) as the suggested new label (36). In one such example, label 100 is sent as part of a Suggested Label object.

When router B receives the Path message with its Suggested Label object, it stores the label and transmits a new Path message to router D (the next route on the new path of LSP 32 computed by router A) (38). In the example shown in FIG. 2, the path from router B to router D does not share a link with the path of LSP 30. Therefore, the Path message from B to D does not include, in this example, a suggested label.

Eventually, router B receives, at 40, a Resv message from D with a label that defines traffic from router B to router D. Router B, at 40, installs an inactive nexthop to D and transmits the suggested label back to router A in a Resv message. Router B continues to forward traffic received for LSP 30 to router C according to LSP 30. Router A receives the Resv message from router B at 42 and saves the suggested label. LSP 32 is now up. Router A the sends a PathTear message for LSP 30 to router B at 44. The PathTear message at 44 serves not only to tear down LSP 30, but also acts as a "switchover" signal for Router B to switch over to LSP 32.

B activates the new nexthop to D at 46 and deletes the nexthop to router C, causing traffic to start flowing to router D. B also sends a PathTear message to router C at 48 to tear down LSP 30.

Returning to FIG. 1, in one example, as illustrated in FIG. 1, a primary path of first LSP instance 25 of LSP 24 has complete overlap with a primary path of second LSP instance 26 from end to end between ingress router 14 and egress router 18. This situation may occur, for example, when service provider network 12 wants to increase the bandwidth of the LSP 24 tunnel.

In this example, there is no need for any of egress router 18 or transit routers 16A, 16B or 16C to allocate any new labels or perform of any label route updates to establish second LSP instance 26. Instead, each of the non-ingress routers along the shared path of first LSP instance 25 and second LSP instance 26 may, via this suggested label mechanism, reuse the labels previously allocated for first LSP instance 25 as the labels used for second LSP instance 26. When first and second instances 25 and 26 have total path overlap and complete label reuse, the techniques also eliminate the need to perform data plane verification of second LSP instance 26, which further simplifies the RSVP MBB procedures. In addition, when first and second LSP instances 25 and 26 have total path overlap, ingress router 14 of LSP 24 may avoid performing an ingress route update for applications using LSP 24.

In another example, as illustrated in FIG. 1, the primary path of first LSP instance 25 of LSP 24 has partial overlap with a primary path of second LSP instance 28 from transit router 16B to egress router 18. In this example, the label reuse may start at transit router 16C and continue all the way to egress router 18 such that there is no need for egress router 18 or transit router 16C to allocate any new labels or perform of any label route updates to establish second LSP instance 28. Instead, egress router 18 and transit router 16C may reuse the labels previously allocated for first LSP instance 25 as the labels used for second LSP instance 28 via the suggested label mechanism, but transit routers 16B and 16D will allocate new labels for second LSP instance 28. Transit routers 16B and 16D will perform label route updates for second LSP instance 28, and ingress router 14 will perform an ingress route update for applications using LSP 24. Because the path of second LSP instance 28 does not completely overlap the path of first LSP instance 25, a conventional data plane verification method may be used to verify second LSP instance 28. In some examples, data traversing on either first LSP instance 25 or second LSP instance 28 takes different label paths from ingress router 14 until reaching transit router 16B, which merges the traffic of the two instances into a common LSP towards egress router 18 of LSP 24.

The label reuse techniques for the RSVP MBB procedures described in this disclosure may be applied for both point-to-point (P2P) LSPs and point-to-multipoint (P2MP) LSPs. For clarity purposes, this disclosure focuses on P2P LSPs, but it should be understood that similar techniques may be adapted and applied to P2MP LSPs.

Returning to FIG. 2, during RSVP MBB procedures, the label reuse techniques may be applied differently at each type of router, i.e., ingress routers, intermediate or transit routers, and egress routers, along LSP 24 to be rerouted. The label reuse techniques originate at ingress router 14 of LSP 24 and require a mechanism for transmitting the existing label from ingress router 14 to its first hop transit router 16. In some example mechanisms, RSVP Path message is modified to include a label object used to store the label. In one such mechanism the label object is the Suggested Label object defined in RFC 3473, but currently limited to use in GMPLS. For additional details of the use of the Suggested Label object in GMPLS, see L. Berger, "Generalized Multi-Protocol Label Switching (GMPLS) Signaling ReserVation Protocol-Traffic Engineering (RSVP-TE) Extensions," Network Working Group RFC 3473, January 2003, the entire contents of which are incorporated by reference herein.

Returning to FIG. 1, ingress router 14 computes a second path (e.g., LSP 26 or LSP 28) for LSP 24 and compares it with the old LSP (LSP 25). If both LSPs share a common link to a common first hop transit router (here, transit router 16A), the ingress route signals the new LSP with an RSVP Path message carrying a Suggested Label object with the same label used in LSP 25. In this example, LSP 26 of FIG. 1 meets this criteria, so, in one FIG. 1 example, ingress router 14 transmits the current label associated with LSP 25 traffic between ingress router 14 and transit router 16A using the Suggested Label object in the RSVP Path message transmitted from router 14 to transit router 16A.

In the example of FIG. 1, the first hop transit router (here, transit router 16A) interprets the Suggested Label object as a request to reuse the label of LSP 25 for LSP 26. The router signals the new LSP towards egress router 18 as usual. However, when transit router 16A receives a Resv message associated with LSP 26 from downstream, it redeems the label suggested by ingress router 14 in the Suggested Label object by sending the label used for LSP 25 in the Resv message of LSP 26 to ingress router 14. Meanwhile, it installs an inactive nexthop for LSP 26 (the new LSP) in the label information base (LIB) entry of the label associated with LSP 25. At this point, the active nexthop of the LIB entry of label for LSP 25 is still LSP 25 (the old LSP), and hence traffic is still flowing along the old LSP.

When ingress router 14 receives the RSVP Resv message of the new LSP carrying the label associated with LSP 25, it realizes that there is no need to update route or forwarding state for any applications or services that are carried by the LSP, because both the outgoing interface and the outgoing label remain unchanged. Therefore, the ingress router 14 can immediately tear down LSP 25 via a PathTear message for LSP 25.

Upon receipt of the PathTear message of the old LSP, the first hop transit router (here, transit router 16A) interprets it as a "switch-over" signal for the traffic. It activates the inactive nexthop of the new LSP (LSP 26) in the fowarding information base (FIB) entry of the label associated with LSP 25, and deletes the nexthop of the LSP 25. The traffic now starts to flow over the new LSP (LSP 26).

The router then propagates the PathTear message downstream along the old LSP. The make-before-break is now completed. On ingress router 14, the switch from LSP 25 to LSP 26 is transparent to all applications and services that are carried by LSP 26.

In one example, with respect to transit routers 16 that are common on both LSP 25 and LSP 28, after the router 16 receives the Path message of the new LSP, router 16 first detects that it is also a transit router of the old LSP (such as, for example, router 16B or 16C of FIG. 1), based on the common SESSION object of the two LSPs. Router 16 then detects that both LSPs share a common link to the nexthop router, based on their ERO in the Path messages. If so, the transit router signals the new LSP by sending a Path message with a Suggested Label object with the label (e.g., Y) of the old LSP.

The nexthop router (i.e. the downstream router of the common link) interprets the Suggested Label object as a request to reuse the label of the old LSP for the new LSP. The router signals the new LSP towards egress router 18 as usual. However, after it receives the Resv message of the new LSP from downstream, it redeems the suggested label by sending the label Y in the Resv message of the new LSP to the upstream router (of the common link). Meanwhile, it installs the new LSP as an inactive nexthop in the LIB entry of the label Y. At this point, the active nexthop of the LIB entry of label Y is still the old LSP, and hence traffic is still flowing along the old LSP.

When the upstream router (of the common link) receives the Resv message of the new LSP carrying the label Y, it realizes that there is no need to update route or forwarding state for the new LSP, because both the outgoing interface and the outgoing label remain unchanged. The route simply signals the Resv message of the new LSP further upstream.

Upon receipt of the PathTear message of the old LSP (as a result of the ingress router's tearing down the old LSP), the router at downstream of the link interprets it as a "switch-over" signal for the traffic. It activates the nexthop of the new LSP in the FIB entry of label Y, and deletes the nexthop of the old LSP. The traffic now starts to flow over the new LSP. The router then propagates the PathTear message downstream along the old LSP.

As another example, transit routers 16 of LSP 24 may be configured to reuse labels previously allocated for an existing instance of LSP 24 as the labels for a new instance of LSP 24 based on one or more conditions. For example, transit router 16 of LSP 24 may reuse labels if the next hop router along the path of the new LSP instance is the same as the next hop router along the path of the existing LSP instance for that session and for that router.

For example, each of transit routers 16 in LSP 26 receives an RSVP Path message including a SESSION object. In some examples, the RSVP Path message also includes a suggested label (in, for instance, a Suggested Label object) to be used by the transit router to identify incoming traffic associated with the second LSP instance from an upstream next hop router along the path of second LSP instance 26 or 28. In some such examples, transit routers 16 then either allocate a new label or use the label in the Suggested Label object to identify incoming traffic associated with second LSP instance 26 or 28. Upon allocating the new label or using the label stored in the Suggested Label object for second LSP instance 26 or 28, each of transit routers 16, upon receiving an RSVP Resv message, sends an RSVP Resv message including the label for second LSP instance 26 or 28 to an upstream router along the path of second LSP instance 26 or 28.

In one example of second LSP instance 26 having a path that completely overlaps the path of first LSP instance 25, any of transit routers 16A, 16B and 16C may receive an RSVP Resv message including a downstream label previously suggested by that transit router 16 for second LSP instance 26 from a next hop router along the shared path. Because the received downstream label for second LSP instance 26 is the same as a downstream label previously received for first LSP instance 25 from the same next hop router, any of transit routers 16A, 16B and 16C may reuse a first label previously allocated by the transit router for first LSP instance 25 as a second label used by the transit router to identify incoming traffic associated with second LSP instance 26. By reusing the label, any of transit routers 16A, 16B and 16C also reuses a label route entry for the reused label previously installed in its forwarding plane without performing a label route update to its forwarding plane.

In the example of FIG. 1, for a second LSP instance 28 having a path that only partially overlaps the path of first LSP instance 25 from transit router 16B to egress router 18, transit router 16D receives a RSVP Path message including a SESSION object but no Suggested Label object. Transit router 16D allocates a new label to identify incoming traffic associated with second LSP instance 28. Transit router 16D also installs a new label route in its forwarding plane based on the new label for second LSP instance 28.

As an additional example, ingress router 14 of LSP 24 may be configured to reuse ingress routes of an existing instance of LSP 24 for a new instance of LSP 24 based on one or more conditions. For example, ingress router 14 of LSP 24 may reuse ingress routes if ingress router 14 detects that, based on the new path computation for LSP 24, that both instances of LSP 24 share a common link to the nexthop router. If so, ingress router 14 signals the new LSP by sending a Path message with a Suggested Label object with the label (e.g., Y) of the old LSP. Ingress router 14 may reuse the label routes upon receipt of the suggested label in a Resv message from the nexthop router.

Figure 3:
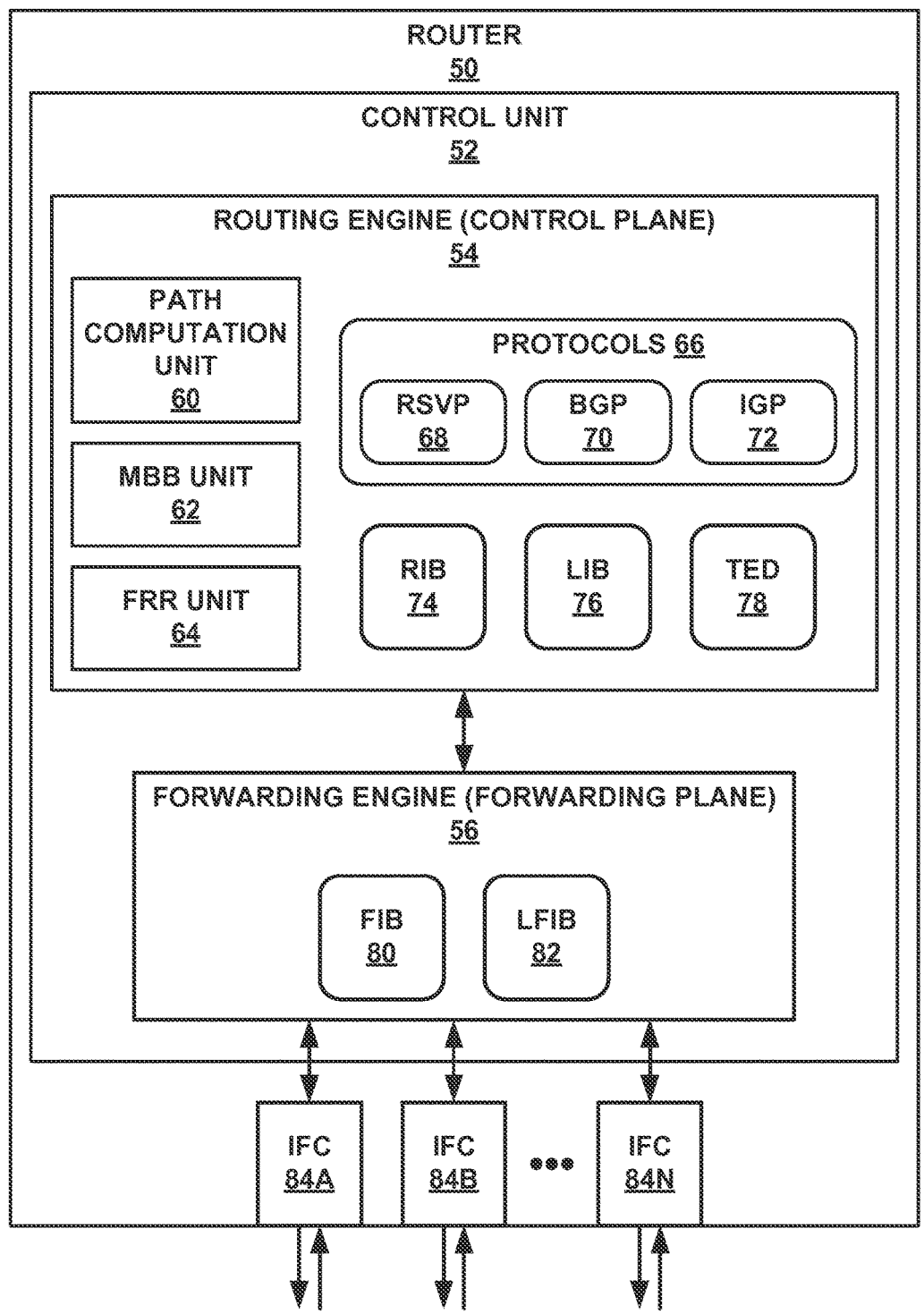
FIG. 3 is a block diagram illustrating an example of a router configured to performing the disclosed techniques of RSVP MBB label reuse.

FIG. 3 is a block diagram illustrating an example router 50 configured to perform the disclosed techniques of RSVP MBB label reuse. Router 50 may operate as any of ingress router 14, transit routers 16 and egress router 18 along the path of LSP 24 from FIG. 1 or along the paths 30 or 32 from FIG. 2. In the illustrated example of FIG. 3, router 50 includes a control unit 52 with a routing engine 54 that provides control plane functionality for the network device and a forwarding engine 56 that provides forwarding or data plane functionality for the network device to send and receive traffic by a set of interface cards 84A-84N ("IFCs 84") that typically have one or more physical network interface ports. Control unit 52 may include one or more daemons (not shown) that comprise user-level processes that run network management software, execute routing protocols to communicate with peer routers or switches, maintain and update one or more routing tables in routing engine 54, and create one or more forwarding tables for installation in forwarding engine 56, among other functions.

Forwarding engine 56 performs packet switching and forwarding of incoming data packets for transmission over a network. As shown in FIG. 3, forwarding engine 56 includes a forwarding information base (FIB) 80 that stores forwarding data structures associating network destinations with next hops and outgoing interfaces. Forwarding engine 56 also includes a label FIB (LFIB) 82 that stores label routes associating an incoming label for a given LSP with an outgoing label and a next hop router. Although not shown in FIG. 3, forwarding engine 56 may comprise a central processing unit (CPU), memory and one or more programmable packet-forwarding application-specific integrated circuits (ASICs).

Routing engine 54 includes various protocols 66 that perform routing functions for router 50. In the illustrated example of FIG. 3, routing engine 54 includes BGP 70 and IGP 72 as routing protocols used to exchange routing information with other routing devices in a network in order to discover the network topology and update a routing information base (RIB) 74. In the examples described in this disclosure, IGP 72 may be a link-state routing protocol such as open shortest path first (OSPF) or intermediate system-intermedia system (IS-IS). In addition, routing engine 54 includes RSVP 68, and specifically RSVP-TE, as a routing protocol used to establish traffic engineered paths, i.e., LSPs, with the other network devices in the network using RIB 74. Routing engine 54 uses RSVP 68 to exchange label mapping messages with other routing devices along the LSPs and update a label information base (LIB) 76.

RIB 74 may describe the topology of the network in which router 50 resides, and may also describe various routes within the network and the appropriate next hops for each route, i.e., the neighboring routing devices along each of the routes. Routing engine 54 analyzes the information stored in RIB 74 to generate forwarding information. Routing engine 54 then installs forwarding data structures into FIB 80 within forwarding engine 56. FIB 80 associates network destinations with specific next hops and corresponding interface ports within the forwarding plane. LIB 76 maintains mappings of next hop labels to the next hops for each route within the network from RIB 74. Routing engine 54 selects specific paths through the network and installs the next hop label mappings for the next hops along those specific paths in LFIB 82 within forwarding engine 56.

In some examples, routing engine 54 uses RSVP 68 to generate and maintain a traffic engineering database (TED) 78 including a complete list of nodes and links in the network that are participating in traffic engineering and a set of attributes for each of the links. For example, TED 78 may include bandwidth reservations for links associated with LSPs through the network. Routing engine 54 may use IGP 72 to advertise the traffic engineering attributes stored in TED 78 to other routing devices in the network. Routing engine 54 may also receive IGP advertisements including traffic engineering attributes from the other routing devices in the network and update TED 78.

According to the techniques described in this disclosure, routing engine 54 of router 50 may be configured to reuse labels previously allocated by RSVP 68 for an existing instance of an LSP when establishing a new instance of the same LSP using RSVP MBB procedures. In some case, the MBB procedures may be triggered by changing properties of an LSP, e.g., changes in bandwidth requirements or other admission control requirements, or by disruptions in resources along the LSP, e.g., failed links and/or nodes. MBB unit 62 in routing engine 54 may perform the RSVP MBB procedures to establish the new LSP instance before tearing down the existing LSP instance. MBB unit 62 may also perform the label reuse techniques described in this disclosure.

For example, in the case where router 50 is operating as a non-ingress (e.g., an egress router or a transit router) along a path of the new LSP instance, MBB unit 62 of routing engine 54 may determine whether to reuse a label previously allocated for the existing LSP instance as the downstream-assigned label for the new LSP instance based on whether the paths of the existing LSP instance and the new LSP instance overlap. In the case of router 50 operating as an egress router, MBB unit 62 may be configured to reuse a label of the existing LSP instance for the new LSP instance upon receiving the reused label as a suggested label from its upstream transit router along path shared between the first and second LSP instances. In the case of router 50 operating as a transit router, MBB unit 62 may be configured to reuse a label of the existing LSP instance for the new LSP instance upon receiving the reused label as a suggested label from an upstream transit or ingress router along a common link to that upstream router. When routing engine 54 reuses a label for the new LSP instance, routing engine 54 does not need to update a label route entry for the reused label in LFIB 82 in forwarding engine 56.

In the case where router 50 is operating as an ingress or transit router of the LSP, router 50 may find that it is unable to reuse a label. This may happen, for instance, when the link to the nexthop router is not the same for the first LSP instance and the second LSP instance of the LSP. When this happens, in some examples, the RSVP Path message will be sent without a suggested label and the RSVP Resv message from the nexthop router will include a label selected by the nexthop router. In one example, routing engine 54 stores the label in an inactive nexthop entry in LIB 76 associated with the second LSP instance of the LSP while continuing to send traffic to the nexthop router designated for the first LSP instance of the LSP.

When router 50 receives the RSVP PathTear message from its upstream router, it activates the inactive nexthop of the new LSP in FIB 80, and deletes the nexthop of the old LSP.

In the case where router 50 is operating as an ingress router of the LSP, router 50 may receive a reused label from a next hop router, based on a suggested label transmitted to the next hop router by router 50. This may occur when the link used to send traffic to the nexthop router is the same for both the existing LSP instance and the new LSP instance of the LSP. In this case, MBB unit 62 may be configured to reuse an ingress route for applications that use the LSP. When the ingress route is reused, routing engine 54 does not need to update the ingress route for the LSP in LFIB 82 in forwarding engine 56.

In the case where router 50 operates as an ingress router of the LSP, routing engine 54 uses path computation unit 60 to select a path for the new LSP instance between the ingress router and the egress of the LSP. For example, path computation unit 60 may use a Constrained Shortest Path First (CSPF) process to compute a shortest path for the LSP based information included in RIB 74 and TED 78 in order to satisfy admission control requirements, e.g., bandwidth requirements and other constraints, associated with the LSP. In the case where the MBB procedures where triggered due to changing admission control requirements, when CSPF is used to compute a path for the new LSP instances that meets the changed requirements, it is possible that the path of the existing LSP instance is still one of the best paths that satisfy the changed requirements. This occurrence provides the opportunity to reuse labels as described in this disclosure.

According to the disclosed techniques, path computation unit 60 may be modified to compute paths for new LSP instances that reuse as much as possible of the same path of the existing LSP instance in order to gain the largest benefit from the label reuse techniques for RSVP MBB procedures. For example, during RSVP MBB procedures, routing engine 54 may use path computation unit 60 to select a path of the new LSP instance based on an amount of overlap with the path of the first LSP instance of the LSP. In one example, path computation unit 60 may perform a modified CSPF computation to select the path of the new LSP instance from a plurality of "best" paths between the ingress router and the egress router of the LSP as the one of the best paths that has the most overlap with the path of the existing LSP instance. In another example, path computation unit 60 may be modified to select the path of the new LSP instance to be the same as the path of the existing LSP instance as long as the path of the existing LSP instance satisfies the admission control requirements of the second LSP instance. The choice of which modified path computation technique is applied by routing engine 54 may be a locally configured policy of path computation unit 60. The modified path computation techniques used to maximize path overlap between new and existing LSP instances during MBB procedures may be applied to both primary path computation and FRR backup path computation.

In some examples, router 50 may be enabled to operate in a label reuse mode of label assignment during the RSVP MBB procedures by default. In this example, an administrator would need to perform a local configuration change of router 50 to change the label assignment mode for the MBB procedures to be other than the label reuse mode. In other examples, router 50 may instead be enabled to operate in a "normal" mode of label assignment during the RSVP MBB procedures, and a change to the label reuse mode may be negotiated between router 50 and the other routing devices in the network. For example, router 50 may advertise its capability to support the label reuse mode using one of the routing protocols, such as IGP 72, BGP 70 or RSVP 68. In this example, if the label reuse mode is supported, an administrator would need to perform a local configuration change of router 50 to change the label assignment mode to the label reuse mode.

Figure 4:
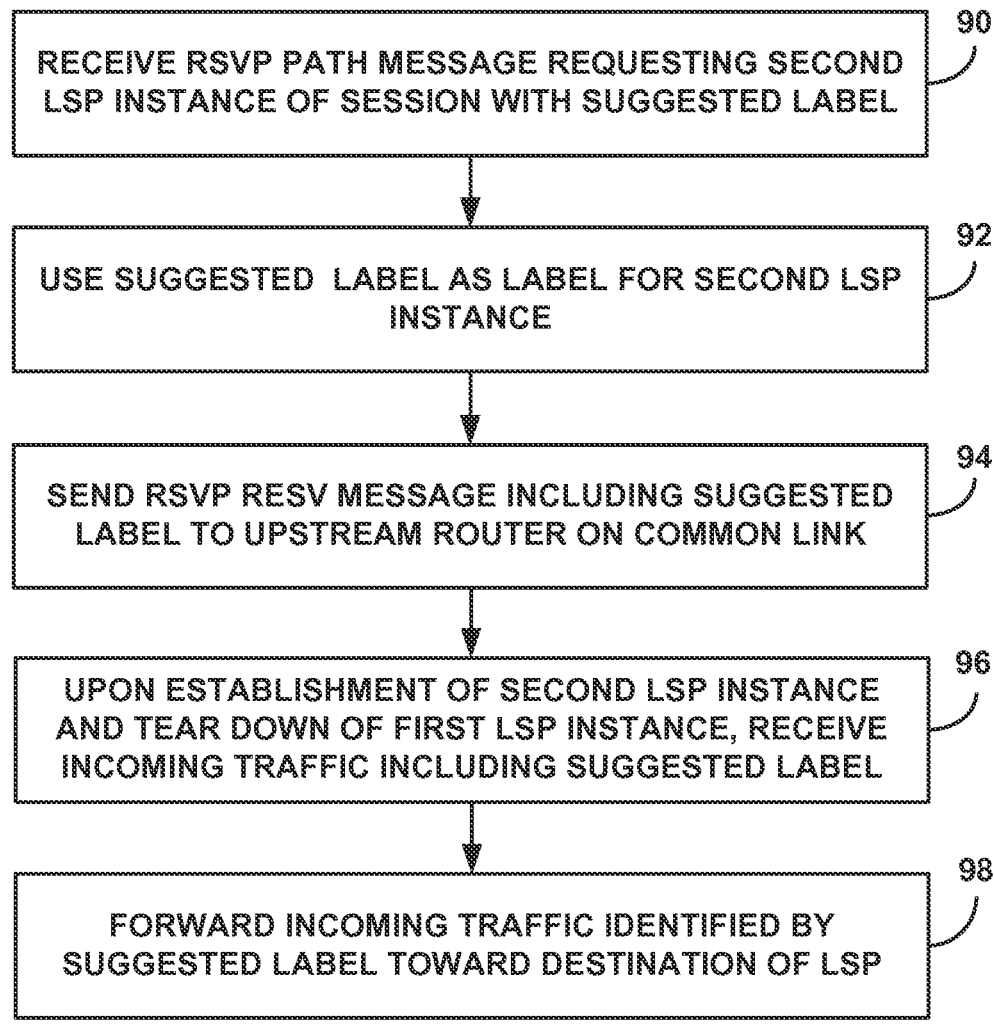
FIG. 4 is a flowchart illustrating an example operation of an egress router of an LSP in a label reuse mode of label assignment for MBB procedures.

FIG. 4 is a flowchart illustrating an example operation of a router 50 of an LSP in a label reuse mode of label assignment for RSVP MBB procedures. The example operation of FIG. 4 is described with respect to router 50 from FIG. 3 when operating as a router of an LSP.

As described above, establishment of a second LSP instance prior to tearing down a first LSP instance is part of the RSVP MBB procedures. During the RSVP MBB procedures, router 50 of an LSP receives an RSVP Path message from an upstream router of the LSP requesting establishment of a second LSP instance of the LSP (90). The RSVP Path message for the second LSP instance may explicitly indicate a second path of the second LSP instance between the ingress router and egress router 50 of the LSP. The RSVP Path message for the second LSP instance propagates through the network according to the second path of the second LSP instance until it reaches egress router 50 of the LSP.

In the example shown in FIG. 4, if there is a common link between the upstream router and router 50 for the first and second LSP instances of the LSP, the RSVP Path message includes a Suggested Label Object having a suggested label (90). Router 50 stores the suggested label as the label to be used for incoming traffic from the upstream router (92).

In some examples, upon receiving the RSVP Path message requesting the second LSP instance, MBB unit 62 in routing engine 54 of egress router 50 reuses a first label previously allocated by egress router 50 for the first LSP instance as a second label used by egress router 50 to identify incoming traffic associated with the second LSP instance. By reusing the previously allocated first label as the second label for the second LSP instance, routing engine 54 does not need to update forwarding engine 56 of egress router 50 by performing a label route add in LFIB 82 for the second label and subsequently performing a label route delete in LFIB 82 for the first label. Instead, forwarding engine 56 will reuse the label route installed in LFIB 82 for the first LSP instance to forward incoming traffic identified by the second label toward a destination of the LSP.

In response to the RSVP Path message requesting the second LSP instance and including the suggested label, egress router 50 sends an RSVP Resv message including the second label for the second LSP instance, i.e., the suggested label, to an upstream router along the path of the second LSP instance (94). RSVP Resv messages will propagate upstream hop-by-hop according to a reverse route of the second path of the second LSP instance until a last RSVP Resv message reaches the ingress router of the LSP. The second LSP instance of the LSP is then established in the network. As part of the MBB procedures, ingress router 14 can tear down the first LSP instance and begin using, i.e., switchover to, the established second LSP instance to send traffic to egress router 50 of the LSP.

Upon establishment of the second LSP instance and tear down of the first LSP instance by the ingress router, forwarding engine 56 of egress router 50 may receive incoming traffic including the suggested second label, i.e., the reused label, from the upstream router along the second path of the second LSP instance (96). Forwarding engine 56 of egress router 50 looks up the second label in LFIB 82 and forwards the incoming traffic identified by the second label toward a destination of the LSP based on the reused label route for the second label (98).

Figure 5:
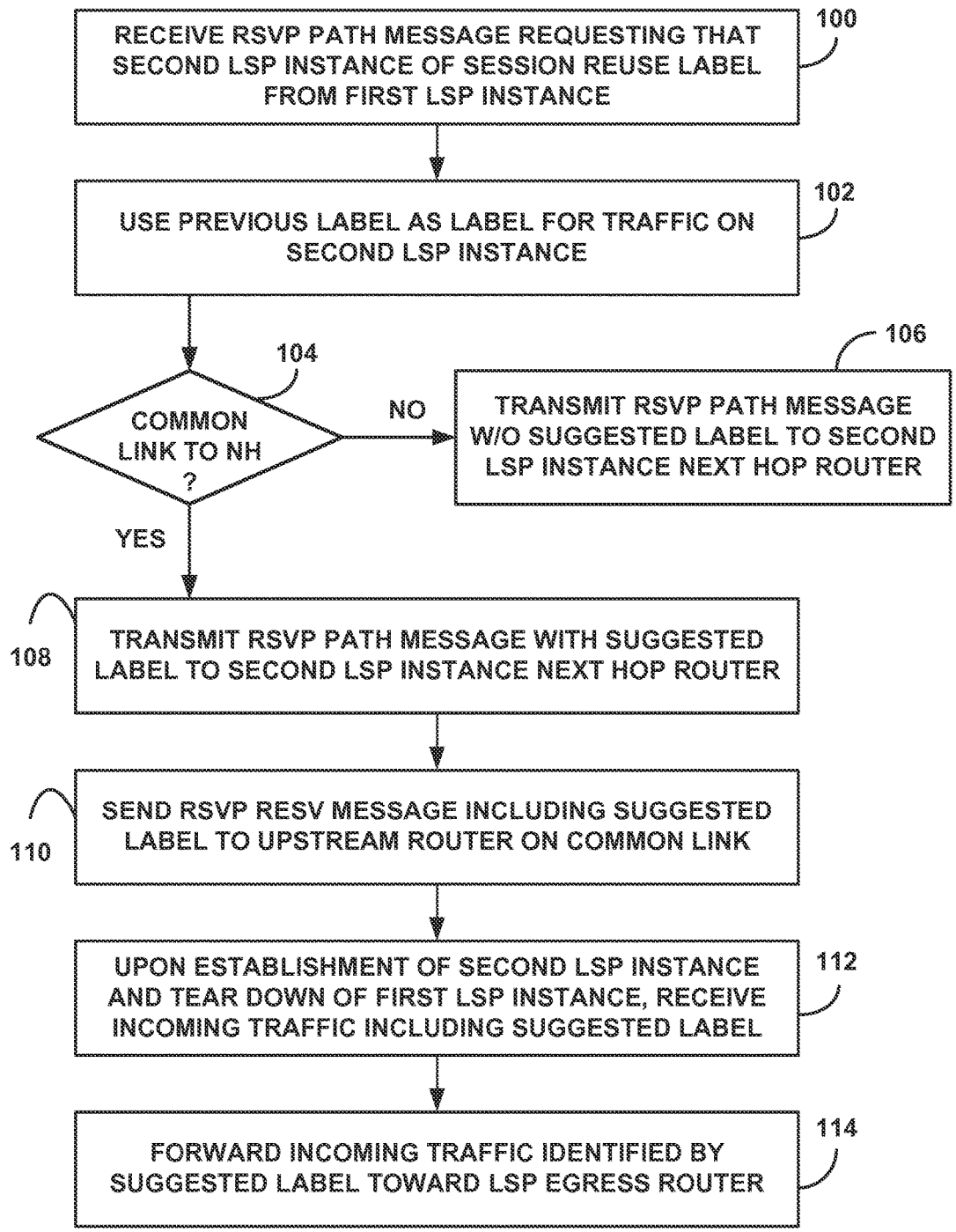
FIG. 5 is a flowchart illustrating an example operation of a transit router of an LSP in a label reuse mode of label assignment for MBB procedures.

FIG. 5 is a flowchart illustrating an example operation of a transit router of an LSP in a label reuse mode of label assignment for RSVP MBB procedures. The example operation of FIG. 5 is described with respect to router 50 from FIG. 3 when operating as a transit router of an LSP. In other examples, the operation of FIG. 5 may also be performed by any of transit routers 16 of LSP 24 from FIG. 1.

As described above, establishment of a second LSP instance prior to tearing down a first LSP instance is part of the RSVP MBB procedures. During the RSVP MBB procedures, transit router 50 of an LSP receives an RSVP Path message from an upstream router of the LSP requesting establishment of a second LSP instance of the LSP (100). The RSVP Path message for the second LSP instance may explicitly indicate the second path of the second LSP instance between the ingress router and an egress router of the LSP. Transit router 50 forwards the RSVP Path message toward the egress router of the LSP according to the second path of the second LSP instance. The RSVP Path message for the second LSP instance propagates through the network according to the second path of the second LSP instance until it reaches the egress router of the LSP.

In the example shown in FIG. 5, if there is a common link between the upstream router and router 50 for the first and second LSP instances of the LSP, the RSVP Path message includes a Suggested Label Object having a suggested label (100). Router 50 stores the suggested label as the label to be used for incoming traffic from the upstream router (102). A check is made at (104) to determine if router 50 is using the same link to the same nexthop router for the second LSP instance that was used for the first LSP instance of the LSP. If not (NO branch of 104), the RSVP Path message is transmitted to the nexthop router without a suggested label (106). If, however, router 50 is using the same link to the same nexthop router for the second LSP instance that was used for the first LSP instance of the LSP (YES branch of 104), the RSVP Path message is transmitted to the nexthop router with the label used for the first LSP instance as the suggested label (108). In some examples, the RSVP Path message to the nexthop router includes a Suggested Label Object having a suggested label when the first and second LSP instances share a common link between router 50 and its nexthop router. In that situation, however, the label is the one previously used to forward traffic to the nexthop router for the first LSP instance.

In response to the RSVP Path message requesting the second LSP instance, the egress router of the LSP sends an RSVP Resv message including a label for the second LSP instance to an upstream router, i.e., a transit router, along the second path of the second LSP instance. RSVP Resv messages will propagate upstream hop-by-hop according to a reverse route of the second path of the second LSP instance. At one point, transit router 50 receives a RSVP Resv message including a second downstream label for the second LSP instance from a next hop router along the second path of the second LSP instance. The second downstream label is used by transit router 50 to identify outgoing traffic associated with the second LSP instance forwarded to the next hop router along the second path of the second LSP instance.

Regardless of whether transit router 50 suggests a label to the nexthop router for the second LSP instance, upon receiving a RSVP Resv message from the nexthop router, transit router 50 sends an RSVP Resv message including the suggested label for the second LSP instance to an upstream router, e.g., a transit router or the ingress router, along the second path of the second LSP instance (110). RSVP Resv messages will propagate upstream hop-by-hop according to a reverse route of the second path of the second LSP instance until a last RSVP Resv message reaches the ingress router of the LSP. The second LSP instance of the LSP is then established in the network. As part of the MBB procedures, the ingress router can tear down the first LSP instance and begin using, i.e., switchover to, the established second LSP instance to send traffic to the egress router of the LSP.

Upon establishment of the second LSP instance and tear down of the first LSP instance by the ingress router, forwarding engine 56 of transit router 50 may receive incoming traffic including the suggested label from the upstream router along the second path of the second LSP instance (112). Forwarding engine 56 of transit router 50 looks up the suggested label in LFIB 82 and forwards the incoming traffic identified by the suggested label along the second path of the second LSP instance toward the egress router of the LSP based on the label route for the suggested label (114). In the case where routing engine 54 of transit router 50 reuses the previously allocated first label as the second label for the second LSP instance and forwarding engine 56 reuses the label route of the first LSP instance for the second LSP instance, forwarding engine 56 forwards the incoming traffic identified by the suggested label based on the reused label route for the second label.

Figure 6:
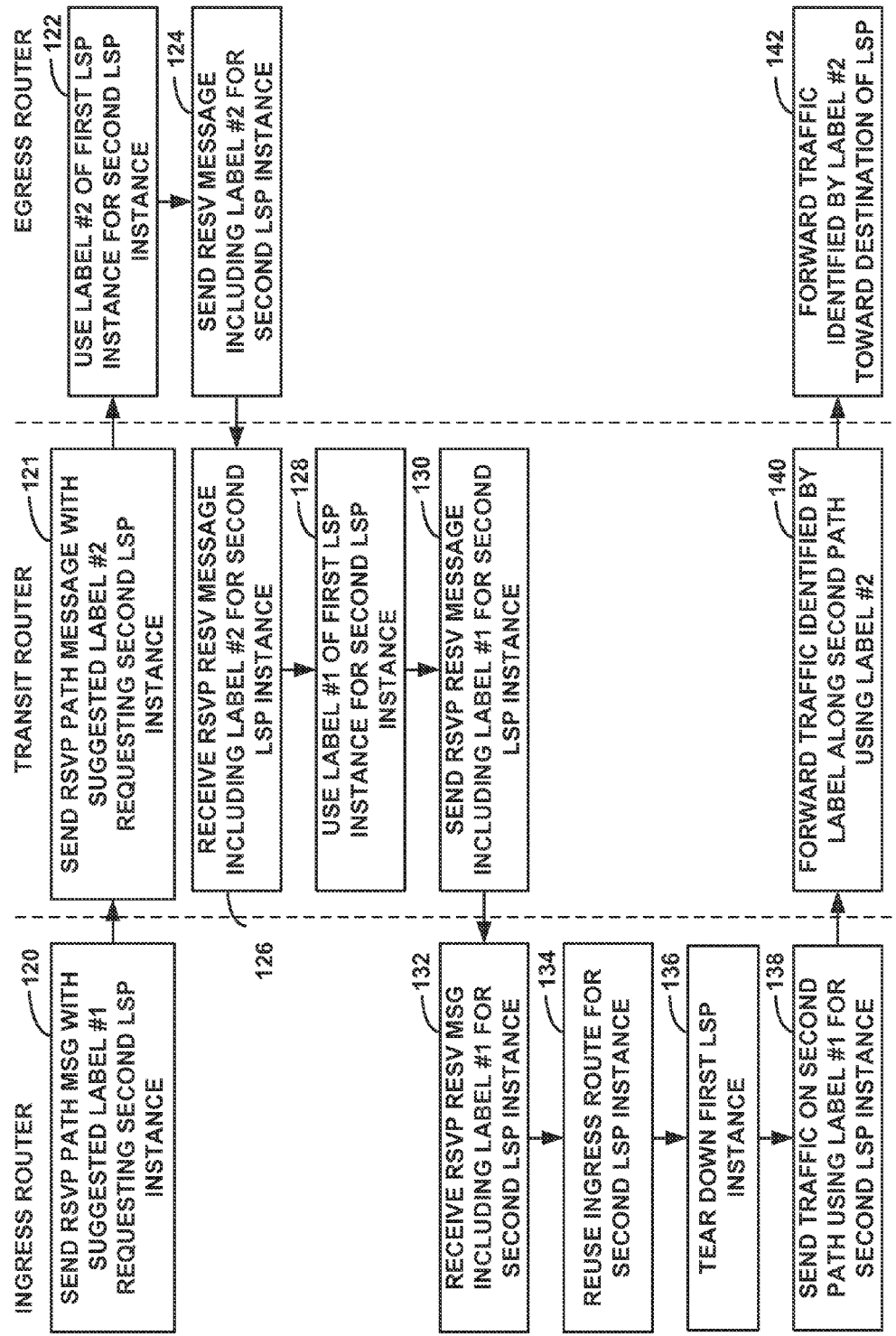
FIG. 6 is a flowchart illustrating an example operation of a system including an ingress router of an LSP and at least one downstream router of the LSP in a label reuse mode of label assignment for MBB procedures.

FIG. 6 is a flowchart illustrating an example operation of a system including an ingress router of an LSP and at least one downstream router of the LSP in a label reuse mode of label assignment for RSVP MBB procedures. The example operation of FIG. 6 is described with respect to ingress router 14, transit routers 16, and egress router 18 of LSP 24 from FIG. 1. In other examples, the operation of FIG. 5 may also be performed by router 50 from FIG. 3 when operating as each of an ingress router, a transit router, and an egress router of an LSP.

In order to establish a new instance of an LSP 24 prior to tearing down the existing instance 25 of the LSP 24 as part of the RSVP MBB procedures, ingress router 14 of LSP 24 sends an RSVP Path message requesting establishment of a second LSP instance 26 of LSP 24 and, if there is a common link to the next hop router from ingress router 14 for both the first and second LSP instance of the LSP, a suggested label #1 based on the label for the first LSP instance is sent to the next hop router (as in LSP instances 25 and 26) (120). The RSVP Path message for the second LSP instance may indicate an explicit second path of the second LSP instance 26, 28 between ingress router 14 and egress router 18 of LSP 24. In accordance with the techniques described in this disclosure, ingress router 14 may select the second path of the second LSP instance 26, 28 based on an amount of overlap with a first path of a first LSP instance 25 of LSP 24. In one example, ingress router 14 may perform a modified CSPF computation to select the second path from a plurality of best paths between ingress router 14 and egress router 18 as the one of the plurality of best paths that has the most overlap with the first path of the first LSP instance. In another example, ingress router 14 may select the second path to be the same as the first path of the first LSP instance as long as the first path satisfies admission control requirements of the second LSP instance.

The RSVP Path message for the second LSP instance propagates from ingress router 14 along transit routers 16 according to the second path of the second LSP instance 26 until it reaches egress router 18 of LSP 24. Along the path of the second LSP instance, if, once again, there is a common link to the next hop router from a transit router 16 for both the first and second LSP instance of the LSP, a suggested label #2 based on the label for the first LSP instance is sent to the next hop router (121). According to the disclosed techniques, upon receiving the RSVP Path message requesting the second LSP instance with a suggested label of label #2, egress router 18 reuses previously allocated label #2 of the first LSP instance for the second LSP instance without updating its forwarding plane with a new label route (122). Egress router 18 sends an RSVP Resv message including the reused label, label #2, for the second LSP instance upstream to transit router 16C along the second path of the second LSP instance 26 (124). The operation of egress router 18 is described in greater detail above with respect to FIG. 4.

RSVP Resv messages propagate upstream hop-by-hop along transit routers 16 according to a reverse route of the second path of the second LSP instance 26 until a last RSVP Resv message reaches ingress router 14 of LSP 24. Each of transit routers 16 of LSP 24 performs the steps 126, 128 and 130. As an example, a transit router directly upstream from egress router 18 receives the RSVP Resv message including the label #2 for the second LSP instance from egress router 18 (126). The label #2 is used by the transit router to identify outgoing traffic associated with the second LSP instance forwarded to egress router 18 along the second path of the second LSP instance 26. Based on the previously received suggested label #1, a transit router directly downstream from ingress router 14 determines to reuse the previously allocated label #1 of the first LSP instance to identify incoming traffic for the second LSP instance (128). The transit router sends an RSVP Resv message including the label #1 for the second LSP instance to an upstream router, e.g., ingress router 14, along the second path of the second LSP instance 26(130).

In one example from FIG. 1, the first path of the first LSP instance 25 and the second path of the second LSP instance 26 overlap from ingress router 14 to egress router 18. In this example, according to the disclosed techniques, each of transit routers 16A, 16B and 16C may reuse the previously allocated label of the first LSP instance 25 for the second LSP instance 26, as suggested by a respective upstream router, without updating its forwarding plane with a new label route. The operation of each of transit routers 16 is described in greater detail above with respect to FIG. 5.

Ingress router 14 receives the RSVP Resv message including the label (label #1) used to identify outgoing traffic for the second LSP instance (132). Based on the receipt of suggested label #1, ingress router 14 reuses an ingress route of the first LSP instance 25 for the second LSP instance 26 (134). In the example from FIG. 1 where the second path of second LSP instance 26 completely overlaps the first path of first LSP instance 25 from ingress router 14 to egress router 18, ingress router 14 receives a reused label #1 for the second LSP instance 26 from next hop transit router 16A as a function of the suggested label #1 provided at 120, and reuses the ingress route of the first LSP instance 25 for the second LSP instance 26 without updating the ingress route in its forwarding plane. In this case, ingress router 14 does not need to update applications using LSP 24 to use a new label to identify the outgoing traffic for the second LSP instance 26.

Upon receiving the RSVP Resv message for the second LSP instance 26 at ingress router 14, the second LSP instance 26 of LSP 24 is established. As part of the MBB procedures, ingress router 14 tears down the first LSP instance 25 of LSP 24 (136). Ingress router 14 then sends traffic of an application along the second path of the second LSP instance 26 using the label #1 for the second LSP instance (138). The traffic propagates from ingress router 14 hop-by-hop to each of transit routers 16 along the second path of the second LSP instance 26 until it reaches egress router 18 of LSP 24. As an example, a transit router directly upstream from egress router 18 forwards incoming traffic identified by a label for the second LSP instance along the second path of the second LSP instance 26 toward egress router 18 using the label #2 (140). Egress router 18 then forwards the incoming traffic identified by the label #2 toward a destination of LSP 24 (142).

Figure 7:
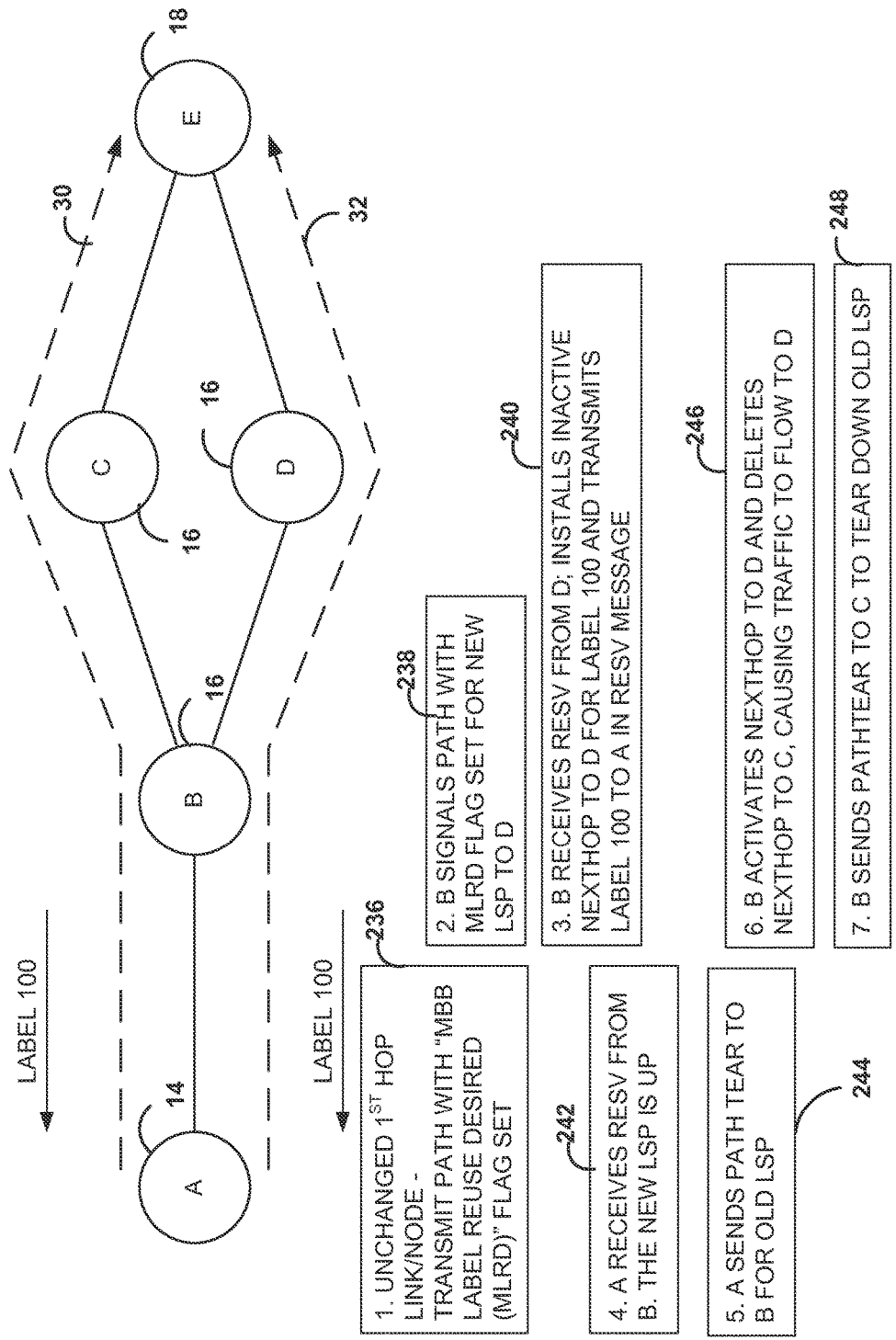
FIG. 7 is a flowchart illustrating another example operation of a system including an ingress router of an LSP and at least one downstream router of the LSP in a label reuse mode of label assignment for MBB procedures.

FIG. 7 is a flowchart illustrating an example operation of a system including an ingress router of an LSP and at least one downstream router of the LSP in a label reuse mode of label assignment for MBB procedures. In the example of FIG. 2, an ingress router 14 (router A) is connected through a transit router 16 (router B) to two other transit routers (routers C and D). Routers C and D are connected in turn to an egress router 18 (router E).

In the example of FIG. 2, an LSP 30 is defined to pass data through routers B and C to egress router E. A label of 100 defines the link between router A and router B. At some time after LSP 30 is defined, router A initiates a new path (LSP 32) and transmits an RSVP Path message to egress router 18 in a label reuse mode. In one example label reuse mode, the RSVP Path message includes a "MBB Label Reuse Desired (MLRD)" flag that is set when ingress router 14 desires label reuse. When received at each transit router 16 and at the egress router 18, a check is made to determine if the link to the next upstream router is over a common link with a previous LSP instance of that LSP. One example process will be described in the context of FIG. 7.

In the example shown in FIG. 7, ingress router 14 transmits an RSVP Path message with MLRD flag set (236). When router B receives the Path message with its MLRD flag set, router B transmits an RSVP Path message with MLRD bit set to router D (the next route on the new path of LSP 32 computed by router A) (238). In the example shown in FIG. 7, the path from router B to router D does not share a link with the path of LSP 30. Therefore, router D does not reuse a label on traffic for the second LSP instance received from node B.

Eventually, router B receives an RSVP Resv message from D with a label that defines traffic from router B to router D and installs an inactive nexthop to D (240). Node B then transmits the label from the first LSP instance back to router A in a RSVP Resv message over the common link. Router B continues to forward traffic received for LSP 30 to router C according to LSP 30. Router A receives the Resv message from router B and saves the label (242). LSP 32 is now up. Router A the sends a PathTear message for LSP 30 to router B (244). The PathTear message serves not only to tear down LSP 30, but also acts as a "switchover" signal for Router B to switch over to LSP 32.

B activates the new nexthop to D and deletes the nexthop to router C (246), causing traffic to start flowing to router D. B also sends a PathTear message to router C to tear down LSP 30 (248).

Figure 8:
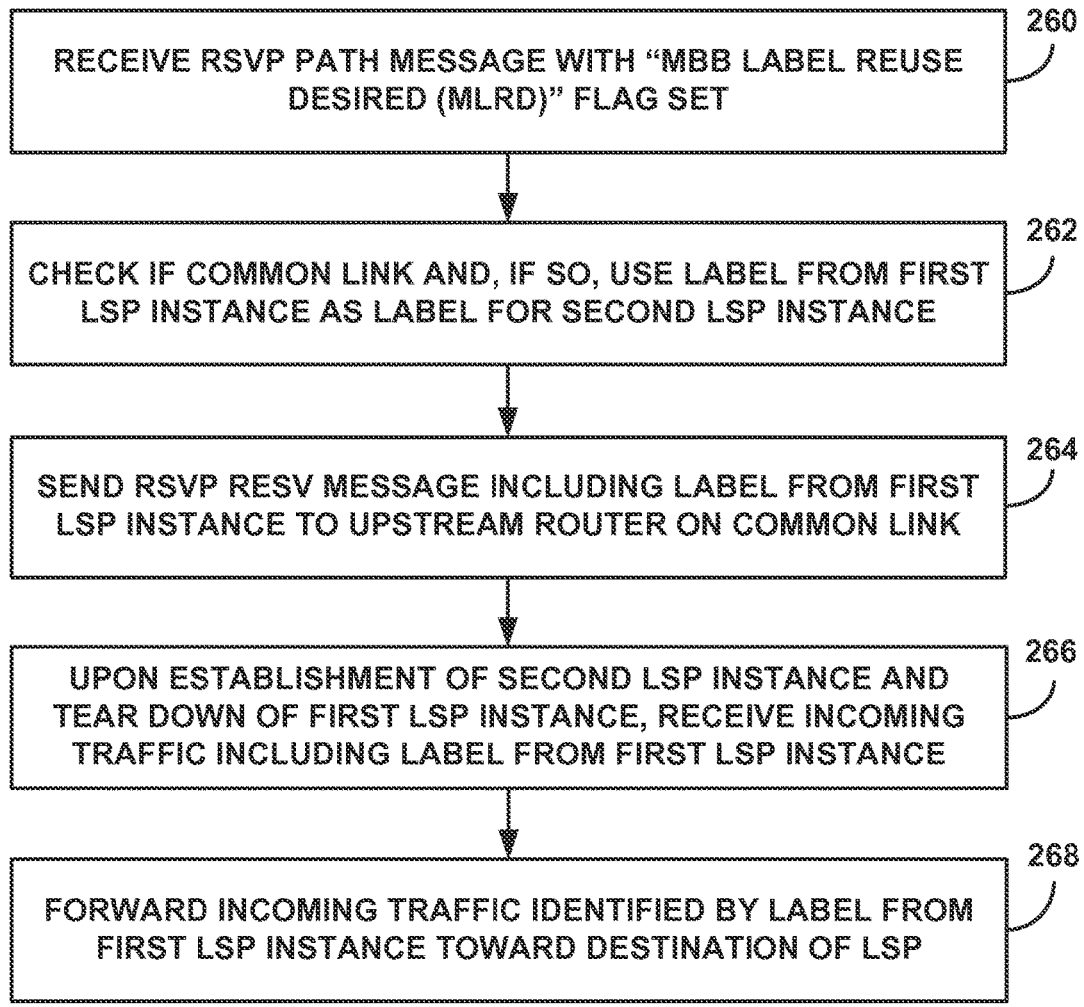
FIG. 8 is a flowchart illustrating an example operation of an egress router of an LSP in a label reuse mode of label assignment for MBB procedures.

FIG. 8 is a flowchart illustrating another example operation of a router 50 of an LSP in a label reuse mode of label assignment for RSVP MBB procedures. The example operation of FIG. 8 is described with respect to router 50 from FIG. 3 when operating as a router of an LSP.

As described above, establishment of a second LSP instance prior to tearing down a first LSP instance is part of the RSVP MBB procedures. During the RSVP MBB procedures, router 50 of an LSP receives an RSVP Path message from an upstream router of the LSP requesting establishment of a second LSP instance of the LSP (260). The RSVP Path message for the second LSP instance may explicitly indicate a second path of the second LSP instance between the ingress router and egress router 50 of the LSP. The RSVP Path message for the second LSP instance propagates through the network according to the second path of the second LSP instance until it reaches an egress router (such as egress router 18 of FIG. 1 or FIG. 2) of the LSP.

In the example shown in FIG. 8, ingress router 14 initiates label reuse by transmitting an RSVP Path message with MLRD bit set to indicate label reuse. The RSVP Path message is received by a router 50 (260). A check is made to determine if there is a common link between the router and its upstream router for the first and second LSP instances of the LSP associated with the RSVP Path message and, if so, router 50 uses the label of the first instance of the LSP as the label of the second instance of the LSP (262).

In some examples, upon receiving the RSVP Path message with MLRD bit set requesting the second LSP instance, MBB unit 62 in routing engine 54 of router 50 reuses a first label previously allocated by router 50 for the first LSP instance as a second label used by egress router 50 to identify incoming traffic associated with the second LSP instance. By reusing the previously allocated first label as the second label for the second LSP instance, routing engine 54 does not need to update forwarding engine 56 of router 50 by performing a label route add in LFIB 82 for the second label and subsequently performing a label route delete in LFIB 82 for the first label. Instead, forwarding engine 56 of the upstream router reuses the label route installed in LFIB 82 for the first LSP instance to forward incoming traffic identified by the second label toward a destination of the LSP.

In response to the RSVP Path message requesting the second LSP instance, router 50 sends an RSVP Resv message including the second label for the second LSP instance, i.e., the label for the first instance, to an upstream router along the path of the second LSP instance (264). RSVP Resv messages propagate upstream hop-by-hop according to a reverse route of the second path of the second LSP instance until a last RSVP Resv message reaches ingress router 14 of the LSP. The second LSP instance of the LSP is then established in the network. As part of the MBB procedures, ingress router 14 can tear down the first LSP instance and begin using, i.e., switchover to, the established second LSP instance to send traffic to egress router 50 of the LSP.

Upon establishment of the second LSP instance and tear down of the first LSP instance by the ingress router, forwarding engine 56 of router 50 may receive incoming traffic including the reused label from the upstream router along the second path of the second LSP instance (266). Forwarding engine 56 of router 50 looks up the reused label in LFIB 82 and forwards the incoming traffic identified by the reused label toward a destination of the LSP based on the reused label route for the second label (268).

Figure 9:
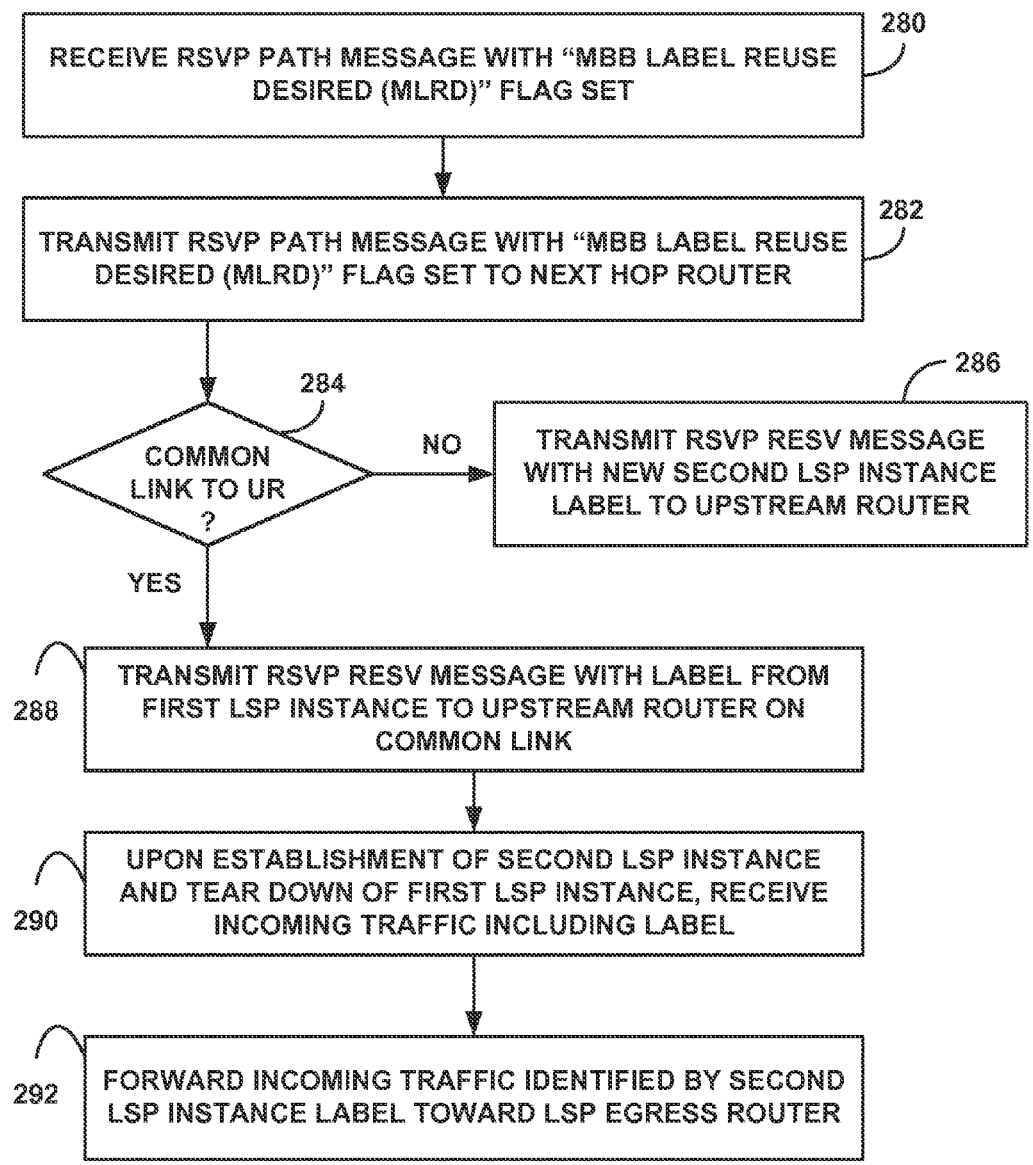
FIG. 9 is a flowchart illustrating an example operation of a transit router of an LSP in a label reuse mode of label assignment for MBB procedures.

FIG. 9 is a flowchart illustrating an example operation of a transit router of an LSP in a label reuse mode of label assignment for RSVP MBB procedures. The example operation of FIG. 9 is described with respect to router 50 from FIG. 3 when operating as a transit router of an LSP. In other examples, the operation of FIG. 9 may also be performed by any of transit routers 16 of LSP 24 from FIG. 1.

As described above, establishment of a second LSP instance prior to tearing down a first LSP instance is part of the RSVP MBB procedures. During the RSVP MBB procedures, transit router 50 of an LSP receives an RSVP Path message with MLRD flag set from an upstream router of the LSP requesting establishment of a second LSP instance of the LSP (280). The RSVP Path message for the second LSP instance may explicitly indicate the second path of the second LSP instance between the ingress router and an egress router of the LSP. Transit router 50 forwards the RSVP Path message toward the egress router of the LSP according to the second path of the second LSP instance. The RSVP Path message for the second LSP instance propagates through the network according to the second path of the second LSP instance until it reaches the egress router of the LSP.

In the example shown in FIG. 9, if the MLRD bit is set in an incoming RSVP PAth message and there is a common link between the router 50 and its upstream router for both the first and second LSP instances of the LSP, router 50 reuses the label from the first LSP instance as the label for the second LSP. In one such example, the RSVP Path message is received (280) and transmitted to the next hop router (282). In one example, the RSVP Path message includes an MBB Label Reuse Flag that is set when ingress router 14 desires label reuse.

In response to the RSVP Path message requesting the second LSP instance, the egress router of the LSP sends an RSVP Resv message including a label for the second LSP instance to an upstream router, i.e., a transit router, along the second path of the second LSP instance. RSVP Resv messages propagate upstream hop-by-hop according to a reverse route of the second path of the second LSP instance. At one point, transit router 50 receives a RSVP Resv message including a label for the second LSP instance from a next hop router along the second path of the second LSP instance. The label is used by transit router 50 to identify outgoing traffic associated with the second LSP instance forwarded to the next hop router along the second path of the second LSP instance.

As shown in FIG. 9, when an RSVP Resv message is received by router 50, a check is made to determine if there is a common link to the upstream router (284). If not, (NO branch of 284), the RSVP Resv message is transmitted to the upstream router with a new label for the second LSP instance of the LSP (286). If, however, router 50 is using the same link to the same upstream router for the second LSP instance as was used for the first LSP instance of the LSP (YES branch of 284), the RSVP Resv message is transmitted to the upstream router with the label used for the first LSP instance of the LSP (288).

RSVP Resv messages continue to propagate upstream hop-by-hop according to a reverse route of the second path of the second LSP instance until a last RSVP Resv message reaches the ingress router of the LSP. The second LSP instance of the LSP is then established in the network. As part of the MBB procedures, the ingress router then tears down the first LSP instance (290) and begins using, i.e., switches over to, the established second LSP instance to send traffic to the egress router of the LSP (292).

It should be noted that the techniques described above may be applied to other MPLS protocols implementing MBB. In some examples of the approach described in FIGS. 7-9 above, a method that uses a label reuse indicator in a message received from an upstream (such as the use of an MLRD bit in the RSVP Path message described above) is used to override label reuse policies that may be set at the router level so as to force label reuse for shared routers of the LSP.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method for establishing a second label switched path (LSP) instance of an LSP having a first LSP instance, the method comprising:
   determining, by each downstream router designated for the second LSP instance of the LSP, whether the downstream router is part of the first LSP instance of the LSP and, if so, whether the first and second LSP instances for that downstream router share a common link to a nexthop router;
   if the first and second LSP instances on one or more of the downstream routers designated for the second instance of the LSP share a common link to the nexthop router, transmitting, from the downstream router, a first message to the nexthop router, wherein the first message includes a suggested label; and
   receiving, from the nexthop router, a second message, wherein the second message includes the suggested label; and
   if the first and second LSP instances of the LSP do not share a common link to the nexthop router, installing an inactive nexthop entry for the second LSP instance.

2. The method of claim 1, wherein the second message is a Resource Reservation Protocol (RSVP) Resv message.

3. The method of claim 1, wherein the method further comprises:
   tearing down the first LSP instance of the first LSP, wherein tearing down includes deleting a nexthop entry associated with the first LSP instance and activating the inactive nexthop entry for the second LSP instance.

4. The method of claim 2, wherein the first message is an RSVP PATH message comprising the suggested label.

5. The method of claim 2, wherein the first message is an RSVP PATH message comprising a Suggested Label object, wherein the Suggested Label object includes the suggested label.

6. A method for establishing a second label switched path (LSP) instance of an LSP having a first LSP instance, the method comprising:
   determining, by each downstream router designated for the second LSP instance of the LSP, whether the downstream router is part of the first LSP instance of the LSP and, if so, whether the first and second LSP instances for that downstream router share a common link to a nexthop router;
   if the first and second LSP instances on one or more of the downstream routers designated for the second instance of the LSP share a common link to the nexthop router, transmitting, from the downstream router, a first message to the nexthop router, wherein the first message includes a suggested label; and
   receiving, from the nexthop router, a second message, wherein the second message includes the suggested label;
   wherein determining whether the downstream router is part of the first instance of the LSP includes comparing session objects associated with the first and second LSP instances.

7. A method for establishing a second label switched path (LSP) instance of an LSP having a first LSP instance, the method comprising:
   determining, by each downstream router designated for the second LSP instance of the LSP, whether the downstream router is part of the first LSP instance of the LSP and, if so, whether the first and second LSP instances for that downstream router share a common link to a nexthop router;
   if the first and second LSP instances on one or more of the downstream routers designated for the second instance of the LSP share a common link to the nexthop router, transmitting, from the downstream router, a first message to the nexthop router, wherein the first message includes a suggested label; and
   receiving, from the nexthop router, a second message, wherein the second message includes the suggested label;
   wherein determining whether the first and second LSP instances for that downstream router share a common link to a nexthop router includes comparing information in an explicit route object associated with each LSP instance.

8. The method of claim 1, wherein the method further comprises:
   receiving, at the downstream router, an RSVP Path message from an upstream router, wherein the RSVP Path message includes a suggested label; and
   transmitting, to the upstream router, an RSVP Resv message including the suggested label.

9. The method of claim 8, wherein the RSVP PATH message comprises a Suggested Label object, wherein the Suggested Label object includes the suggested label.

10. A router comprising:
    a routing engine comprising one or more processors configured to:
       establish a second LSP instance of an LSP having a first LSP instance, wherein the second LSP instance includes designated routers on a second path;
       determine whether the router is part of the first instance of the LSP and, if so, whether the first and second LSP instances for the router share a common link to a nexthop router;
       if the first and second LSP instances of the LSP share a common link to the nexthop router, transmit a first message to the nexthop router, wherein the first
message includes a suggested label, and receive,
from the nexthop router, a second message, wherein
the second message includes the suggested label; and
if the first and second LSP instances of the LSP do not
share a common link to the nexthop router, install an
inactive nexthop entry for the second LSP instance;
and
a forwarding engine comprising one or more processors
configured to, upon establishment of the second LSP
instance and tear down of the first LSP instance,
forward traffic along the path of the second LSP
instance.

11. The router of claim 10, wherein, when the routing engine uses the suggested label, the router is further configured to forward the traffic along the second path of the second LSP instance without updating forwarding state.

12. The router of claim 10, wherein the second message is a Resource Reservation Protocol (RSVP) Resv message.

13. The router of claim 10, wherein the one or more processors of the routing engine are further configured to tear down the first LSP instance, wherein, when the first and second LSP instances of the LSP do not share a common link to the nexthop router, tearing down includes deleting a nexthop entry associated with the first LSP instance and activating the inactive nexthop entry for the second LSP instance.

14. The router of claim 12, wherein the first message is an RSVP Path message comprising a Suggested Label object, wherein the Suggested Label object includes the suggested label.

15. The router of claim 10, wherein determining whether the downstream router is part of the first instance of the LSP includes comparing session objects associated with the first and second LSP instance.

16. The router of claim 10, wherein determining whether the first and second LSP instances for that downstream router share a common link to a nexthop router includes comparing information in the explicit route object associated with each LSP instance.

17. A non-transitory computer-readable medium comprising instructions that when executed cause one or more programmable processors of a router to:
establish a second LSP instance of an LSP having a first
LSP instance, wherein the second LSP instance
includes designated routers on a second path;
determine whether the router is part of the first instance of
the LSP and, if so, whether the first and second LSP
instances for the router share a common link to a
nexthop router;
if the first and second LSP instances of the LSP share a
common link to a nexthop router, transmit a first
message to the nexthop router, wherein the first message includes a suggested label;
receive, from the nexthop router, a second message,
wherein the second message includes the suggested
label; and
if the first and second LSP instances of the LSP do not
share a common link to a nexthop router, install an
inactive nexthop entry for the second LSP instance.

18. A system comprising:
an egress router;
an ingress router of a label switched path (LSP) established between the ingress router and the egress router, the ingress router configured to send traffic along a first path through a first LSP instance of the LSP and to send a first message requesting establishment of a second LSP instance of the LSP, the first message indicating a second path for the second LSP instance; and
at least one downstream router of the second LSP instance of the LSP, wherein each downstream router designated for the second LSP instance receives the first message and transmits the first message to a nexthop router along the second path designated in the first message;
wherein, when the first and second LSP instances for the at least one downstream router share a common link to the nexthop router, the at least one downstream router:
transmits the first message over the common link to the
nexthop router, wherein the first message includes a
suggested label for the common link; and
receives a nexthop message from the nexthop router,
wherein, when the first and second LSP instances of the
LSP do not share a common link to the nexthop router,
the downstream router installs an inactive nexthop
entry for the second LSP instance, wherein the inactive
nexthop entry includes a label provided by the nexthop
router.

19. The system of claim 18, wherein the ingress router is further configured to tear down the first LSP instance of the LSP, and to send traffic along the second path of the second LSP instance toward the egress router of the LSP.

20. The system of claim 18, wherein the ingress router is further configured to select the second path of the second LSP instance based on an amount of overlap with the first path of the first LSP instance.

21. The system of claim 18, wherein, to select the second path of the second LSP instance, the ingress router is configured to select the second path as the path having the most overlap with the first path of the first LSP instance from a plurality of best paths between the ingress router and the egress router.

22. The system of claim 18, wherein, to select the second path of the second LSP instance, the ingress router is configured to select the second path to be the same as the first path of the first LSP instance if the first path satisfies admission control requirements of the second LSP instance.

23. In a system in which each downstream router is connected across a first link to an upstream router and across a second link to a nexthop router, a method for establishing a second label switched path (LSP) instance of an LSP having a first LSP instance, the method comprising:
determining, by a downstream router designated for the
second LSP instance of the LSP, whether the downstream router is part of the first LSP instance of the
LSP;
if the downstream router is part of the first LSP instance
of the LSP, determining, for the downstream router,
whether the first and second LSP instances for that
downstream router share a common link to the nexthop
router designated by the second LSP instance of the
LSP;
transmitting an RSVP Path message to the nexthop router
designated by the second LSP instance of the LSP;
receiving an RSVP Resv message from the nexthop router
designated by the second LSP instance of the LSP,
wherein the RSVP Resv message includes a label; and
if the first and second LSP instances for the downstream
router do not share a common link to the nexthop router
designated by the second LSP instance of the LSP,
installing an inactive nexthop entry for the second LSP
instance in the downstream router while continuing to
use an active nexthop entry to send traffic to the
nexthop router designated for the first LSP instance of the LSP, wherein the inactive nexthop entry includes the label received from the nexthop router with the RSVP Resv message.

24. The method of claim 23, wherein the method further comprises:
   receiving, from the upstream router and at the downstream router, a RSVP Path message including a suggested label;
   storing the suggested label as the label associated with traffic associated with the second LSP instance; and
   redeeming the suggested label by sending the suggested label in a RSVP Resv message to the upstream router.

25. The method of claim 24, wherein the RSVP Path message comprises a Suggested Label object, wherein the Suggested Label object includes the suggested label.

26. The method of claim 23, wherein the method further comprises: tearing down the first LSP instance of the first LSP, wherein tearing down includes deleting the active nexthop entry associated with the first LSP instance in the downstream router and activating the inactive nexthop entry associated with the second LSP instance in the downstream router.

27. A method for establishing a second label switched path (LSP) instance of an LSP having a first LSP instance, the method comprising:
   enabling label reuse for a label associated with the first LSP instance, wherein enabling includes determining if a first message associated with the LSP includes a label reuse indicator;
   determining, for each downstream router, if label reuse is enabled for the second LSP instance;
   if label reuse is enabled for the second LSP instance, determining whether the first and second LSP instances for that downstream router share a common link to an upstream router;
   if the first and second LSP instances share a common link between the downstream router and the upstream router, transmitting an upstream router message to the upstream router, wherein the upstream router message includes a label associated with first LSP instance traffic from the upstream router to the downstream router; and
   receiving, from the upstream router, traffic associated with the second LSP instance, wherein the traffic associated with the second LSP instance is labelled with the label associated with the first LSP instance traffic from the upstream router to the downstream router.

28. The method of claim 27, wherein the first message is an RSVP Path message and the label reuse indicator is a MBB Label Reuse Desired (MLRD) flag.

* * * * *